United States Patent
Lee et al.

(10) Patent No.: US 10,741,846 B2
(45) Date of Patent: Aug. 11, 2020

(54) NEGATIVE ELECTRODE FOR LITHIUM METAL BATTERY AND LITHIUM METAL BATTERY COMPRISING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Yonggun Lee, Suwon-si (KR); Saebom Ryu, Suwon-si (KR); Toshinori Sugimoto, Hwaseong-si (KR); Wonseok Chang, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 260 days.

(21) Appl. No.: 15/584,430

(22) Filed: May 2, 2017

(65) Prior Publication Data

US 2017/0324097 A1    Nov. 9, 2017

(30) Foreign Application Priority Data

May 9, 2016 (KR) .......... 10-2016-0056612
May 2, 2017 (KR) .......... 10-2017-0056261

(51) Int. Cl.
*H01M 4/62* (2006.01)
*H01M 4/134* (2010.01)
(Continued)

(52) U.S. Cl.
CPC .......... *H01M 4/628* (2013.01); *C09D 4/06* (2013.01); *H01M 4/134* (2013.01);
(Continued)

(58) Field of Classification Search
CPC ...... H01M 4/628; H01M 4/382; H01M 4/405; H01M 4/1395; H01M 4/622; H01M 4/366;
(Continued)

(56) References Cited

U.S. PATENT DOCUMENTS

| 4,357,215 A | 11/1982 | Goodenough et al. |
| 7,105,251 B2 | 9/2006 | Miyaki et al. |

(Continued)

FOREIGN PATENT DOCUMENTS

| JP | 2013541168 A | 11/2013 |
| KR | 1020050041093 A | 5/2005 |

(Continued)

OTHER PUBLICATIONS

Cheng et al., "Dendrite-Free Lithium Deposition Induced by Uniformly Distributed Lithium Ions for Efficient Lithium Metal Batteries", Advanced Materials, 2016, 28, 2888-2895.

(Continued)

*Primary Examiner* — Laura Weiner
(74) *Attorney, Agent, or Firm* — Cantor Colburn LLP

(57) ABSTRACT

A negative electrode for a lithium metal battery, the negative electrode including: a lithium metal electrode comprising lithium metal or a lithium metal alloy; and a protective layer on at least a portion of the lithium metal electrode, wherein the protective layer has a Young's modulus of about $10^6$ Pascals or greater, wherein the protective layer includes at least one first particle, wherein the first particle includes an organic particle, an inorganic particle, an organic-inorganic particle, or a combination thereof, and wherein the first particle has a particle size of greater than 1 micrometer to about 100 micrometers, and a crosslinked material comprising a polymerizable oligomer, which is disposed between first particles of the at least one first particle.

22 Claims, 22 Drawing Sheets

(51) Int. Cl.
  *H01M 10/0568* (2010.01)
  *H01M 10/42* (2006.01)
  *H01M 10/0565* (2010.01)
  *H01M 4/1395* (2010.01)
  *C09D 4/06* (2006.01)
  *H01M 4/38* (2006.01)
  *H01M 4/40* (2006.01)
  *H01M 4/525* (2010.01)
  *H01M 10/0525* (2010.01)
  *H01M 10/0569* (2010.01)
  *H01M 4/02* (2006.01)
  *H01M 4/36* (2006.01)
  *C08K 3/30* (2006.01)

(52) U.S. Cl.
  CPC ......... *H01M 4/1395* (2013.01); *H01M 4/382* (2013.01); *H01M 4/405* (2013.01); *H01M 4/525* (2013.01); *H01M 4/622* (2013.01); *H01M 10/0525* (2013.01); *H01M 10/0565* (2013.01); *H01M 10/0568* (2013.01); *H01M 10/0569* (2013.01); *H01M 10/4235* (2013.01); *C08K 3/30* (2013.01); *H01M 4/366* (2013.01); *H01M 2004/021* (2013.01); *H01M 2004/027* (2013.01); *H01M 2220/20* (2013.01); *H01M 2300/0034* (2013.01); *H01M 2300/0037* (2013.01); *Y02E 60/122* (2013.01); *Y02T 10/7011* (2013.01)

(58) Field of Classification Search
  CPC ............. H01M 4/134; H01M 10/0525; H01M 10/0569; H01M 10/0568; H01M 10/0565; H01M 10/4235; H01M 2300/0037; H01M 2300/0034; H01M 2004/027; H01M 2004/021; H01M 2220/20; C09D 4/06; Y02E 60/122; Y02T 10/7011
  See application file for complete search history.

(56) References Cited

U.S. PATENT DOCUMENTS

| | | | |
|---|---|---|---|
| 7,513,136 B2 | 4/2009 | Laliberte et al. | |
| 7,531,012 B2 | 5/2009 | Sudano et al. | |
| 7,547,492 B2 | 6/2009 | Awano et al. | |
| 7,629,083 B2 | 12/2009 | Cho et al. | |
| 7,968,224 B2 | 6/2011 | Sudano et al. | |
| 8,563,168 B2 | 10/2013 | Balsara et al. | |
| 9,564,638 B2 | 2/2017 | Uemura | |
| 2002/0187398 A1 | 12/2002 | Mikhaylik et al. | |
| 2005/0095504 A1 | 5/2005 | Kim et al. | |
| 2009/0263725 A1 | 10/2009 | Balsara et al. | |
| 2010/0221611 A1 | 9/2010 | Menke et al. | |
| 2010/0248026 A1 | 9/2010 | Hinoki et al. | |
| 2011/0033755 A1 | 2/2011 | Eitouni et al. | |
| 2011/0206994 A1 | 8/2011 | Balsara et al. | |
| 2011/0281173 A1 | 11/2011 | Singh et al. | |
| 2013/0273422 A1 | 10/2013 | Wegner et al. | |
| 2013/0337337 A1* | 12/2013 | Lee ................. | H01M 10/0565 429/317 |
| 2014/0023915 A1 | 1/2014 | Matsuda et al. | |
| 2015/0155592 A1 | 6/2015 | Pratt | |
| 2015/0249243 A1 | 9/2015 | Nagino et al. | |
| 2016/0013462 A1 | 1/2016 | Cui et al. | |
| 2016/0013515 A1 | 1/2016 | Lee et al. | |
| 2016/0064770 A1 | 3/2016 | Lee et al. | |
| 2016/0064772 A1 | 3/2016 | Choi et al. | |
| 2016/0064773 A1 | 3/2016 | Choi et al. | |
| 2016/0072148 A1 | 3/2016 | Lee et al. | |
| 2016/0079625 A1 | 3/2016 | Shon et al. | |
| 2016/0087306 A1 | 3/2016 | Lee et al. | |
| 2016/0093879 A1 | 3/2016 | Song et al. | |
| 2016/0093916 A1 | 3/2016 | Moon et al. | |
| 2016/0111695 A1 | 4/2016 | Kanamura et al. | |
| 2016/0240831 A1 | 8/2016 | Zeng et al. | |
| 2016/0294005 A1 | 10/2016 | Lee et al. | |
| 2016/0329567 A1 | 11/2016 | Lee et al. | |
| 2016/0336618 A1 | 11/2016 | Lee et al. | |
| 2016/0351956 A1 | 12/2016 | Lee et al. | |
| 2016/0372743 A1 | 12/2016 | Cho et al. | |
| 2017/0062829 A1 | 3/2017 | Ryu et al. | |
| 2017/0301920 A1 | 10/2017 | Liu et al. | |
| 2017/0324097 A1 | 11/2017 | Lee et al. | |

FOREIGN PATENT DOCUMENTS

| | | | |
|---|---|---|---|
| KR | 1020130126673 A | | 11/2013 |
| WO | 9701870 | | 1/1997 |
| WO | 0139293 A2 | | 5/2001 |
| WO | WO 01/39293 | * | 5/2001 |
| WO | 2013033126 A1 | | 3/2013 |

OTHER PUBLICATIONS

Liang et al., "Polymer Nanofiber-Guided Uniform Lithium Deposition for Battery Electrodes", NANO Letters, 2015, pp. A-G.
Yan et al., "Ultrathin Two-Dimensional Atomic Crystals as Stable Interfacial Layer for Improvement of Lithium Metal Anode", NANO Letters, 2014, 14, 6016-6022.
Zhang, et al., "Facile assembly of a polystyrene microsphere/graphene oxide/porphyrin composite with core-shell structure", RSC Advances, 2014, 4, 37854-37858.
Zheng et al., "Interconnected hollow carbon nanospheres for stable lithium metal anodes", Nature Nanotechnology, 2014, pp. 1-6.
European Search Report for European Patent Application No. 17169982.0 dated Jul. 28, 2017.

* cited by examiner

NEGATIVE ELECTRODE FOR LITHIUM METAL BATTERY AND LITHIUM METAL BATTERY COMPRISING THE SAME

CROSS-REFERENCE TO RELATED APPLICATION

This application claims the benefit of Korean Patent Application No. 10-2016-0056612, filed on May 9, 2016, and Korean Patent Application No. 10-2017-0056261, filed on May 2, 2017, in the Korean Intellectual Property Office, and all the benefits accruing therefrom under 35 U.S.C. § 119, the content of which, in its entirety, is incorporated herein by reference.

BACKGROUND

1. Field

The present disclosure relates to a negative electrode for a lithium metal battery and a lithium metal battery including the negative electrode.

2. Description of the Related Art

Lithium secondary batteries are high-performance batteries having a relatively high energy density as compared to other currently available secondary batteries, and are applicable to various fields including, for example, electric vehicles.

A lithium secondary battery may use a lithium metal thin film as a negative electrode. When a lithium metal thin film is used as the negative electrode, the negative electrode may react with the liquid electrolyte during charging or discharging of the battery due to the high reactivity between the lithium metal and the electrolyte, and dendritic growth may occur on the lithium metal thin film negative electrode. Accordingly, a lithium secondary battery including a lithium metal thin film may have reduced lifetime and stability. Therefore, there is a need for a lithium secondary battery having improved properties.

SUMMARY

Provided is a negative electrode for a lithium metal battery, the negative electrode including a protective layer with desirable mechanical properties.

Provided is a lithium metal battery with improved cell performance including the negative electrode.

According to an aspect of an embodiment, a negative electrode for a lithium metal battery includes: a lithium metal electrode including a lithium metal or a lithium metal alloy; and a protective layer on at least a portion of the lithium metal electrode, wherein the protective layer has a Young's modulus of about $10^6$ Pascals (Pa) or greater, wherein the protective layer includes at least one first particle, wherein the first particle includes an organic particle, an inorganic particle, an organic-inorganic particle, or a combination thereof, and wherein the first particle has a particle size of greater than 1 micrometer (μm) to about 100 μm, and a crosslinked material of a polymerizable oligomer, which is disposed between first particles of the at least one first particle.

According to an aspect of another embodiment, a lithium metal battery includes a positive electrode, a negative electrode, and an electrolyte between the positive electrode and the negative electrode, wherein the negative electrode includes: a lithium metal electrode including lithium metal or a lithium metal alloy; and a protective layer on at least a portion of the lithium metal electrode, wherein the protective layer has a Young's modulus of about $10^6$ Pascals or greater, wherein the protective layer includes at least one first particle, wherein the first particle has a particle size of greater than 1 micrometer to about 100 micrometers, and a crosslinked material including a polymerizable oligomer, which is disposed between first particles of the at least one first particle.

Also disclosed is a method of manufacturing a negative electrode, the method including: providing a lithium metal electrode including lithium metal or a lithium metal alloy; and disposing a protective layer on at least a portion of the lithium metal electrode to manufacture the negative electrode, wherein the protective layer has a Young's modulus of about $10^6$ Pascals or greater and includes at least one first particle, wherein the first particle includes an organic particle, an inorganic particle, an organic-inorganic particle, or a combination thereof, and wherein the first particle has a particle size of greater than 1 micrometer to about 100 micrometers, and a crosslinked material including a polymerizable oligomer, which is disposed between first particles of the at least one first particle.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
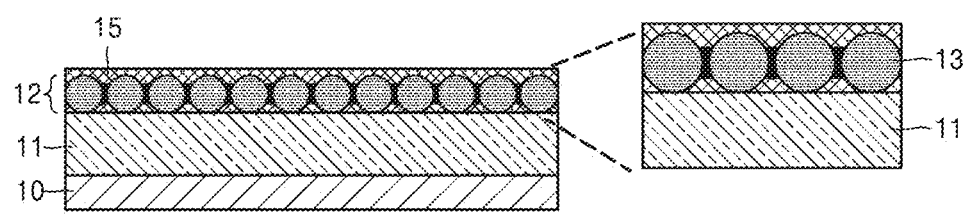
FIGS. 1A to 1D are schematic views illustrating various structures of an embodiment of a negative electrode for lithium metal battery.

Reference will now be made in detail to embodiments of a negative electrode for a lithium metal battery and a lithium metal battery including a negative electrode according to any of the embodiments, examples of which are illustrated in the accompanying drawings, wherein like reference numerals refer to like elements throughout. In this regard, the present embodiments may have different forms and should not be construed as being limited to the descriptions set forth herein. Rather, these embodiments are provided so that this disclosure will be thorough and complete, and will fully convey the scope of the invention to those skilled in the art. Accordingly, the embodiments are merely described below, by referring to the figures, to explain aspects.

When an element or layer is referred to as being "on" or "above" another element or layer, it includes the element or layer that is directly or indirectly in contact with the element or layer. Thus it will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "average particle size" or "average particle diameter" or "D50 particle size" refers to a particle diameter corresponding to 50% of the particles in a distribution curve in which particles are accumulated in the order of particle diameter from the smallest particle to the largest particle and a total number of accumulated particles is 100%. The average particle size may be measured by methods known to those of skill in the art. For example, the average particle size may be measured with a particle size analyzer or may be measured by using a transmission electron microscope (TEM) or a scanning electron microscope (SEM) image. As an example of other measuring methods, average particle size may be measured with a measurement device using dynamic light scattering, the number of particles within predetermined size ranges may be counted, and an average particle diameter may be calculated therefrom.

As used herein the term "porosity" is used to refer to a measure of the empty space (i.e., voids or pores) in a material and is determined as a percentage of the volume of voids in a material based on the total volume of the material.

According to an embodiment of the present disclosure, disclosed is a negative electrode for a lithium metal battery, the negative electrode including: a lithium metal electrode including a lithium metal or a lithium metal alloy; and a protective layer on at least a portion of the lithium metal electrode, wherein the protective layer has a Young's modulus of about $10^6$ Pa or greater, and wherein the protective layer includes at least one first particle, wherein the first particle comprises an organic particle, an inorganic particle, an organic-inorganic particle, or a combination thereof, and wherein the first particle has a particle size of greater than 1 micrometer (μm) to about 100 μm, and a crosslinked material of a polymerizable oligomer, which is disposed between first particles of the at least one first particle.

The lithium metal or the lithium metal alloy has a relatively high electric capacity per unit weight, and thus may be used to implement a high-capacity battery. However, using such a lithium metal or lithium metal alloy may cause dendritic growth during the deposition/dissolution of lithium ions during charging and discharging of the battery and consequently results in a short circuit between the positive and the negative electrodes. A lithium metal or lithium metal alloy electrode may be highly reactive with the electrolyte, and thus may result in a side reaction between the lithium metal or lithium metal alloy and the electrolyte, thereby reducing the cycle lifetime of a battery. To address this problem, a protective layer which protects the surface of the lithium metal or lithium metal alloy electrode has been developed. In this regard, the present inventors have advantageously developed a negative electrode for a lithium metal battery, the negative electrode including a protective layer on a lithium metal electrode.

The protective layer according to an embodiment may include the at least one particle having a particle size of greater than 1 μm to about 100 μm and a crosslinked material including a polymerizable oligomer. The crosslinked material including the polymerizable oligomer may fill pores and empty spaces between the particles and thus is disposed between the particles. The protective layer may have improved strength due to this integrated structure.

The polymerizable oligomer is an oligomer having a crosslinkable functional group. As used herein, the term "polymerizable oligomer" refers to an oligomer which is capable of being polymerized to form a polymer. The polymerizable oligomer may have a weight average molecular weight of about 5000 Daltons or less, and in some embodiments, about 2,000 Daltons or less, and in other embodiments, about 1,000 Daltons or less, and in some other embodiments, about 200 Daltons to about 1,000 Daltons, and in still other embodiments, about 200 Daltons to about 500 Daltons. When the polymerizable oligomer has a weight average molecular weight within these ranges, the polymerizable oligomer may be in a readily injectable form, for example, a liquid form, or may be soluble in a solvent. The polymerizable oligomer may have a low viscosity of about 3 centipoise (cP) to about 50 cP, or about 3 cP to about 30 cP, or about 3 cP to about 20 cP. When the polymerizable oligomer has a viscosity within this range, a composition including the polymerizable oligomer may easily permeate between the particles of the protective layers and fill the gaps between the particles in the protective layer, so that the protective layer may have high strength.

For example, the polymerizable oligomer may include diethylene glycol diacrylate (DEGDA), triethylene glycol diacrylate (TEGDA), tetraethylene glycol diacrylate (TTEGDA), polyethylene glycol diacrylate (PEGDA), dipropylene glycol diacrylate (DPGDA), tripropylene glycol diacrylate (TPGDA), ethoxylated trimethylolpropane triacrylate (ETPTA), acrylate-functionalized ethylene oxide, 1,6-hexanediol diacrylate, ethoxylated neopentyl glycol diacrylate (NPEOGDA); propoxylated neopentyl glycol diacrylate (NPPOGDA), allyl methacrylate (ALMA), trimethylolpropane triacrylate (TMPTA), trimethylolpropane trimethacrylate (TMPTMA), pentaerythritol triacrylate (PETA), ethoxylated propoxylated trimethylol propane triacrylate (TMPEOTA)/(TMPPOTA), propoxylated glyceryl triacrylate, tris(2-hydroxyethyl) isocyanurate triacrylate (THEICTA), pentaerythritol tetraacrylate (PETTA), dipentaerythritol pentaacrylate (DPEPA), or a combination thereof.

The crosslinked material may have a weight average molecular weight of about 10,000 Daltons to about 300,000 Daltons, or about 10,000 Daltons to about 250,000 Daltons, or about 10,000 Daltons to about 100,000 Daltons.

The crosslinked material may have a degree of crosslinking of, for example, about 75% to about 100%, or about 90% to 100%, or about 95% to about 100%.

The polymerizable oligomer and the crosslinked material including the polymerizable oligomer may have ionic conductivity. When the polymerizable oligomer and the crosslinked material including the polymerizable oligomer have ionic conductivity, the protective layer may have further improved conductivity.

In some embodiments, the amount of the crosslinked material in the protective layer may be from about 10 parts by weight to about 50 parts by weight, and in some embodiments, about 20 parts by weight to about 40 parts by weight, and in other embodiments, about 30 parts by weight to about 40 parts by weight, based on 100 parts by weight of the particles in the protective layer. When the amount of the crosslinked material in the protective layer is within these ranges, the protective layer may have improved mechanical properties.

In some embodiments, in addition to the at least one particle (also referred to as a "first particle") having a size of greater than 1 μm and about 100 μm, the protective layer may further include a second particle having a smaller particle size than the first particle. In some embodiments, the protective layer may further include a plurality of particles having different sizes, in addition to the second particle.

The second particle has a smaller particle size than the first particle, and the second particle may have a particle size of about 1 μm to about 100 μm. In other embodiment, the second particle may have a particle size of about 1 μm to about 50 μm, or about 10 μm to about 10 μm, or about 1.1 μm to about 3 μm, or about 1.1 μm to about 1.5 μm, or about 1.1 to about 1.3 μm. For example, the first particle may have a size of about 3 μm, and the second particle may have a size of about 1 μm. A weight ratio of the first particle to the second particle is not specifically limited, and may be for example, about 1:99 to 99:1, and in some embodiments, about 10:1 to 2:1, and in other embodiments, about 1:1.

The protective layer may have a Young's modulus of about $10^6$ Pa or greater, or about $10^7$ Pa or greater, or about $10^8$ Pa or greater, or about $10^9$ Pa or greater, for example, about $10^6$ Pa to about $10^{12}$ Pa, or about $10^7$ Pa to about $10^{11}$ Pa, or about $10^8$ to about $10^{16}$ Pa. When the protective layer has a Young's modulus within these ranges, the protective layer may have good tensile strength and good mechanical properties.

A Young's modulus is used as a measure of the stiffness of the protective layer and has the same meaning as a "tensile modulus." The tensile modulus of the protective layer may be measured according to ASTM D412 using a dynamic mechanical analysis system (DMA800, available from TA Instruments) as follows. Protective layer samples are prepared according to the ASTM D412 standard (Type V specimens), and variations in strain with respect to stress in a protective layer sample are measured at about 25° C., a relative humidity of about 30%, and a rate of 5 millimeters (mm) per minute, thereby to obtain a stress-strain curve. The tensile modulus of the protective layer sample is calculated from the slope of the stress-strain curve.

The at least one particle in the protective layer may have a cross-linked structure. The at least one particle in the protective layer may have a chemically cross-linked structure or a physically cross-linked structure. The at least one particle in the protective layer may include, for example, an organic particle of a cross-linked polymer obtained from a polymer having a cross-linkable functional group, an inorganic particle having a cross-linked structure due to a cross-linkable functional group on a surface thereof, or the like, or may be a combination thereof. The cross-linkable functional group, which is involved in cross-linking reaction, may be, for example, an acryl group, a methacryl group, a vinyl group, or the like.

A particle having a chemically cross-linked structure refers to a particle in which cross-linking has occurred using chemical methods (e.g., chemical agents) to facilitate chemical bonding of cross-linkable functional groups present in the material. A particle having a physically cross-linked structure refers to a particle in which cross-linking has occurred using physical methods, for example, heating a polymer forming the particle until it reaches its glass transition temperature (Tg), in order to facilitate bonding of cross-linkable functional groups, i.e., cross-links which are not formed using chemical agents. The cross-linking may occur within the particle itself, between adjacent particles in the protective layer, or may be a combination thereof.

The lithium metal or lithium metal alloy of the lithium metal electrode may have a thickness of about 100 μm or less, and in some embodiments, about 80 μm or less, or about 50 μm or less, or about 30 μm or less, or about 20 μm or less, and in some other embodiments, about 0.1 to 60 μm. For example, the lithium metal or lithium metal alloy may have a thickness of about 1 to 25 μm, and in some embodiments, about 5 to 20 μm, and in some other embodiments about 10 μm to about 20 μm.

The shape of the at least one particle in the protective layer may include a spherical shape, a microsphere shape, a rod shape, an ellipsoidal shape, a radial shape, or the like. A combination comprising at least one of the foregoing may also be used. When the at least one particle in the protective layer has a spherical shape, the at least one particle in the protective layer may be a microsphere having an average particle diameter of greater than 1 μm to about 100 μm or less. The microspheres may have an average particle diameter of about 1.5 μm to about 75 μm, or about 1.5 μm to about 50 μm, for example, about 1.5 μm to about 10 μm.

Figure 1B:
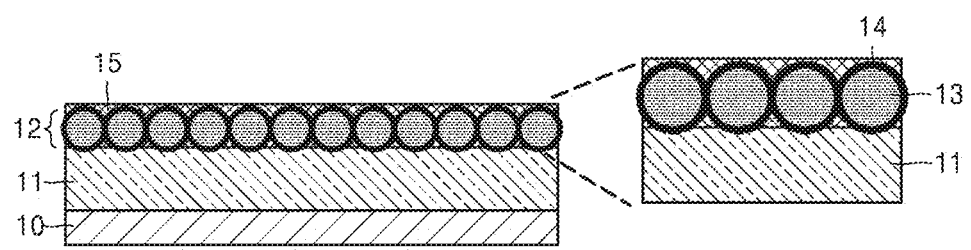
Figure 1C:
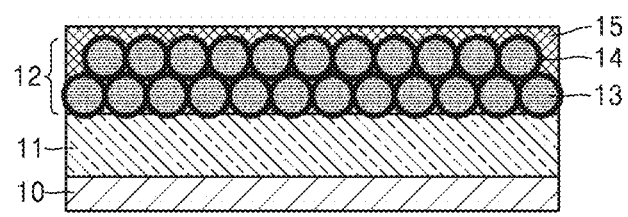
Figure 1D:
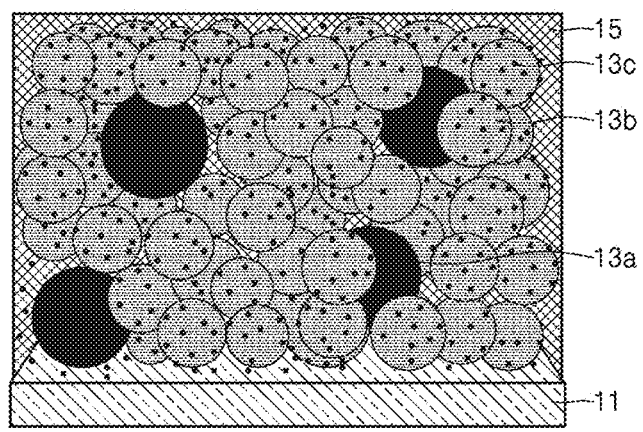
Figure 1E:
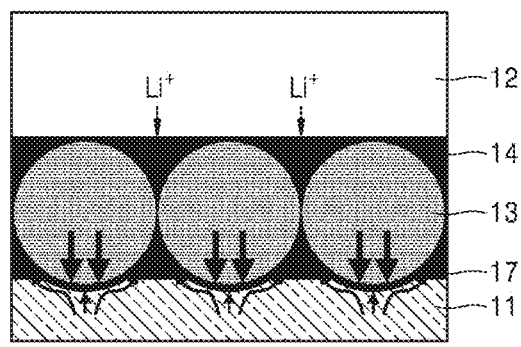
FIGS. 1E and 1F are schematic views explaining the theoretical principle behind use of a protective layer on a negative electrode for suppressing and guiding dendritic growth in a lithium metal battery, according to an embodiment.
Figure 1F:
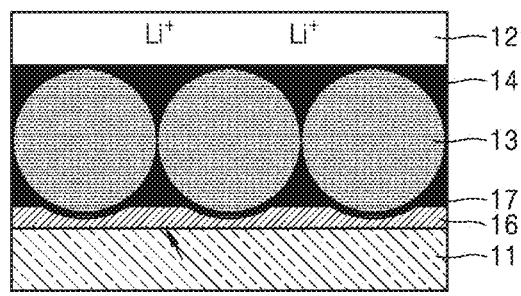
Figure 1G:
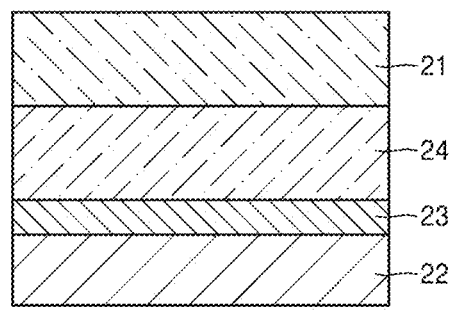
FIGS. 1G to 1K are schematic views illustrating structures of a lithium metal battery according to various embodiments.
Figure 1H:
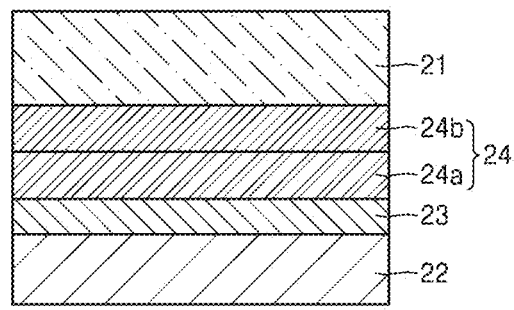
Figure 1I:
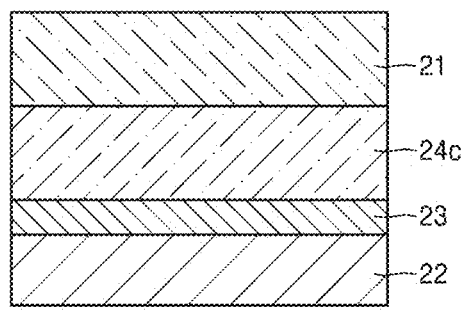
Figure 1J:
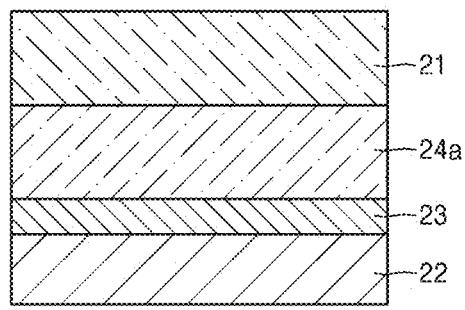
Figure 1K:
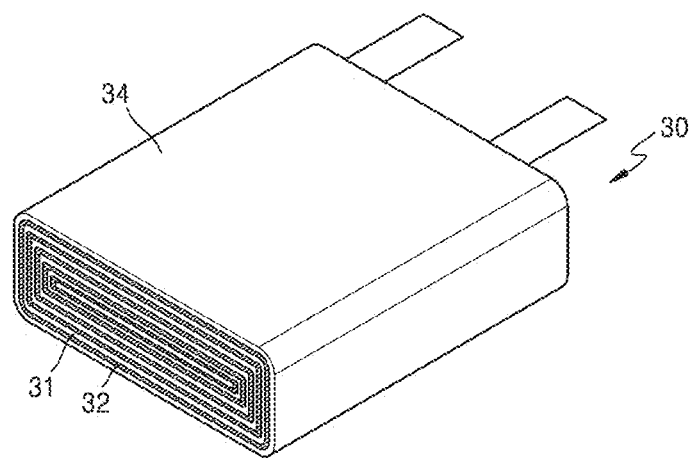
Figure 1L:
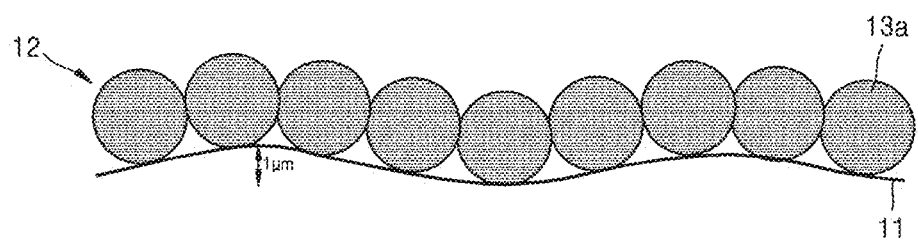
FIGS. 1L and 1M are schematic views illustrating structures of a negative electrode for a lithium metal battery, according to various embodiments.
Figure 1M:
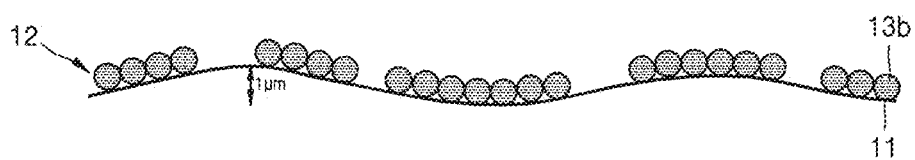

FIG. 1L is a schematic view of a negative electrode for a lithium metal battery according to an embodiment, illustrating a protective function of a protective layer for a lithium metal electrode in the negative electrode, when the particles in the protective layer are microspheres having a particle diameter greater than about 1 μm and about 100 μm or less. FIG. 1M is a schematic view of a negative electrode for a lithium metal battery, illustrating a protective function of a protective layer for a lithium metal electrode in a negative electrode for a lithium metal battery, when microspheres in the protective layer have an average particle diameter of about 1 μm or less.

Referring to FIGS. 1L and 1M, a protective layer 12 including microspheres 13a may be stacked on a lithium metal electrode 11. A surface coating fraction of the microspheres 13a in the protective layer 12 of the lithium metal electrode 11 and the gap between the microspheres 13a are factors which directly impact the protective function of the protective layer 12 of the lithium metal electrode 11. The surface coating fraction refers to the portion of the surface of the lithium metal electrode which includes the protective layer relative to a total surface area of the lithium metal electrode. The surface coating fraction may be about 80%, or about 85%, or about 90%, or about 95%, or about 100% of the total surface area of the lithium metal electrode.

The lithium metal electrode 11 may be, for example, a lithium metal. As shown in FIG. 1L, the lithium metal electrode 11 may be thin enough to have soft characteristics with a thickness of, for example, about 5 μm to about 50 μm, or about 10 μm to about 30 μm, or about 15 μm to about 25 μm. The lithium metal electrode 11 may have a surface step difference of about ±1 μm. To protect the lithium metal electrode 11 having such a surface step difference, it may be effective to use the microspheres 13a having an average particle diameter greater than 1 μm to about 100 μm in the protective layer 12.

Meanwhile, as illustrated in FIG. 1M, when the protective layer 12 on the lithium metal electrode 11 includes microspheres having an average particle diameter of 1 µm or less, for example, about 5 nanometers (nm) to about 300 nm, the aggregation and surface coating fraction of the microspheres may be poor, so that the protective layer 12 may have an increased porosity, and liquid electrolyte may be more likely contact the lithium metal.

The particle size may mean an average particle diameter when the at least one particle in the protective layer 12 is of a spherical shape, or may mean a length of the major axis when the at least one particle is of a rod shape. For example, when the at least one particle has a rod shape, a minor to major axis ratio of the particle may be, for example, about 1:1 to about 1:30, or about 1:2 to about 1:25, or about 1:5 to about 1:20.

The at least one particle may include any polymer that may be suitable to form a protective layer.

In some embodiments, the at least one particle in the protective layer 12 may include a polymer having low wettability against a liquid electrolyte.

The at least one particle in the protective layer may include at least one selected from a polystyrene homopolymer, a copolymer including a styrene repeating unit, a copolymer including a repeating unit having a cross-linkable functional group, a cross-linked polymer, or a combination thereof. For example, the at least one particle in the protective layer may be a polymer, e.g., a homopolymer or a copolymer, including a styrene repeating unit. When the at least one particle in the protective layer is a polymer including a styrene repeating unit, which has hydrophobicity and essentially no wettability to the electrolyte, and the polymer does not adversely affect the lithium metal electrode, then the reactivity of the lithium metal electrode with the electrolyte may be suppressed.

The at least one particle may include a polymer including: homopolystyrene, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9 alkyl) acrylate) copolymer; a cross-linked polymer thereof; or a combination thereof.

The polymer may include a cross-linked polymer. Examples of the cross-linked polymer include a cross-linked product of poly(styrene-divinylbenzene) copolymer, poly(styrene-divinylbenzene) copolymer, a cross-linked product of a poly(methyl methacrylate-divinylbenzene), or a combination thereof.

A combination comprising at least one of the foregoing polymers may also be used.

In a copolymer including a styrene repeating unit, the amount of the styrene repeating unit may be from about 65 to 99 parts by weight, and in some embodiments, about 80 to 99 parts by weight, and in some embodiments, about 90 to 99 parts by weight, and in some other embodiments, about 96 to 99 parts by weight, based on 100 parts by weight of the copolymer.

In a copolymer including a divinylbenzene as a repeating unit, the amount of divinylbenzene may be from about 1 to 35 parts by weight, and in some embodiments, about 1 to 20 parts by weight, and in some embodiments, about 1 to 10 parts by weight, and in some other embodiments, about 1 to 4 parts by weight, and in some other embodiments, about 3 to 7 parts by weight, and in still other embodiments, about 5 parts by weight, based on 100 parts by weight of the copolymer.

The above-listed copolymers may include a block copolymer, a random copolymer, an alternating copolymer, a graft copolymer, and the like. A combination comprising at least one of the foregoing may also be used. These copolymers may have a weight average molecular weight of about 10,000 Daltons to about 500,000 Daltons. The copolymer may be, for example, a block copolymer.

In a block copolymer including a plurality of blocks, the blocks may be referred to as a first block including a first repeating unit, a second block including a second repeating block, a third block including a third repeating unit, etc., or the like.

In the block copolymer, a first block including a first repeating unit may have a weight average molecular weight of about 10,000 Daltons or greater, and in some embodiments, about 10,000 Daltons to about 500,000 Daltons, and in some other embodiments, about 15,000 Daltons to about 400,000 Daltons, and in some embodiments about 20,000 to about 200,000 Daltons. The amount of the block including the first repeating unit may be about 20 parts by weight to about 50 parts by weight, for example, about 20 parts by weight to about 40 parts by weight, or for example, about 22 parts by weight to about 30 parts by weight, based on 100 parts by weight of the block copolymer. When using such a polymer block, the protective layer may have good mechanical properties, for example, improved strength.

In the block copolymer, a second block including a second repeating unit may have a weight average molecular weight of about 10,000 Daltons or greater, and in some embodiments, about 10,000 Daltons to about 500,000 Daltons, and in some other embodiments, about 15,000 Daltons to about 400,000 Daltons. When using a block having a weight average molecular weight within these ranges, the protective layer may have improved ductility, elasticity, and strength characteristics.

The block copolymer may include a diblock copolymer (A-B), a triblock copolymer (A-B-A' or B-A-B'), or a combination thereof.

In a triblock copolymer including a first block (A), a second block (B), and a third block (C), a total amount of the first and third blocks may be about 20 parts by weight to about 35 parts by weight, and in some embodiments, about 22 parts by weight to about 30 parts by weight, based on 100 parts by weight of the triblock copolymer, and the amount of the second block may be about 65 parts by weight to about 80 parts by weight, and in some embodiments, about 70 parts by weight to about 78 parts by weight, based on 100 parts by weight of the triblock copolymer.

The at least one particle in the protective layer may include polyvinyl pyridine, polyvinyl cyclohexane, polyglycidyl acrylate, poly(2,6-dimethyl-1,4-phenylene oxide), polyolefin, poly(tert-butyl vinylether), polycyclohexyl vinyl ether, polyvinyl fluoride, a poly(styrene-co-maleic anhydride) copolymer, polyglycidyl methacrylate, polyacrylonitrile, a polymeric ionic liquid (PIL), or a combination thereof.

The at least one particle in the protective layer may include a poly(styrene-divinylbenzene) copolymer, a poly (methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(methyl acrylate-divinylbenzene) copolymer, a poly(ethyl acrylate-divinylbenzene) copolymer, a poly(pentyl acrylate-divinylbenzene) copolymer, poly(butyl acrylate-divinylbenzene) copolymer, a poly(propyl acrylate-divinylbenzene) copolymer, a poly(acrylonitrile-butadiene-styrene) copolymer, or a combination thereof.

When the at least one particle in the protective layer includes a cross-linked polymer as described above, the individual particles are connected due to cross-linking between the particles, and as a result, the protective layer may have improved mechanical strength. The protective layer may have a degree of crosslinking of about 10 to 30%, for example, about 12 to 28%, or for example about 15% to about 25%.

In some embodiments, the protective layer may include a liquid electrolyte. When the protective layer includes a liquid electrolyte, the liquid electrolyte may form ion conducting paths so that the negative electrode may have improved conductivity. Thus, a lithium metal battery with stable cycle characteristics may be manufactured using a negative electrode including the protective layer.

The liquid electrolyte may include an organic solvent, an ionic liquid, and a lithium salt. The liquid electrolyte may occupy about 30 volume percent (%) to about 60 volume % of the total volume of the protective layer. For example, the liquid electrolyte may occupy about 35 volume % to about 55 volume %, or about 40 volume % to about 50 volume % of the total volume of the protective layer.

In some embodiments, the at least one particle in the protective layer may have a particle size of about 1.1 μm to about 50 μm, and in some embodiments, about 1.3 μm to about 50 μm, and in some other embodiments, about 1.5 μm to about 10 μm.

In some embodiments, the at least one particle may include a 1:1 weight ratio of a poly(styrene-divinylbenzene) copolymer microsphere having an average particle diameter of about 3 μm and a poly(styrene-divinylbenzene) copolymer microsphere having an average particle diameter of about 8 μm; or may include a 1:1 weight ratio of a poly(styrene-divinylbenzene) copolymer microsphere having an average particle diameter of about 3 μm and a poly(styrene-divinylbenzene) copolymer microsphere having an average particle diameter of about 1.1 μm to about 1.3 μm; or may include a 1:1 weight ratio of a poly(styrene-divinylbenzene) copolymer microsphere having an average particle diameter of about 3 μm and a poly(styrene-divinylbenzene) copolymer microsphere having an average particle diameter of about 1.3 μm; or may include 1 1:1 weight ratio of a poly(styrene-divinylbenzene) copolymer microsphere having an average particle diameter of about 3 μm and a poly(styrene-divinylbenzene) copolymer microsphere having an average particle diameter of about 1.1 μm.

In some embodiments, the at least one particle may be a microsphere having a monomodal particle size (diameter) distribution. The monomodal particle size distribution is defined as having a standard deviation of less than 40%, for example, about 20% or less, or for example, about 10% or less, and may be about 1% to less than 40%, or about 3% to about 10%, as analyzed by a particle size analyzer (Dynamic Light Scattering: DLS, Nicomp 380).

In some embodiments, the at least one particle in the protective layer may include a large-diameter particle having a size of about 8 μm and a small-diameter particle having a size of about 3 μm. For example, the at least one particle in the protective layer may include a large-diameter particle having a size of about 3 μm and a small-diameter particle having a size of about 1.1 μm to about 1.3 μm, or about 1.1 μm, or about 1.3 μm. A weight ratio of the large-diameter particles to the small-diameter particles may be, for example, about 4:1 to about 9:1 by weight, or may be about 5:1, or about 6:1, or about 7:1, or about 8:1.

Pores (i.e., spaces) may be present between individual particles in the protective layer. In some embodiments, about 80% or more of the pores in the protective layer may be filled with the crosslinked material including the polymerizable oligomer. For example, about 85% or greater, about 90% or greater, about 95% or greater, about 98% or greater, or about 98% to 100% of pores of the protective layer may be filled with the crosslinked material including the polymerizable oligomer.

The structure of the negative electrode for a lithium metal batteries, according to various exemplary embodiments, will be described with reference to FIGS. 1A to 1D. In FIGS. 1A to 1D, as a non-limiting example, particles 13 in a protective layer 12 may have a microspheric shape.

Referring to FIG. 1A, a negative electrode according to an embodiment may include a lithium metal electrode 11 deposited on a current collector 10, wherein the lithium metal electrode 11 may include a lithium metal or a lithium metal alloy. The protective layer 12 may be disposed on the lithium metal electrode 11. The protective layer 12 may include particles 13. The particles 13 in the protective layer 12 may form a monodisperse layer without particle aggregation.

A crosslinked material 15 including a polymerizable oligomer may be disposed between the particles 13 in the protective layer 12. The cross-linked material 15 may be disposed in the gaps (e.g., pores) between the particles 13, so that the protective layer 12 may have an integrated structure of the cross-linked material 15 and the particles 13, and as a result, may have improved mechanical properties. The use of a protective layer 12 having such a structure in a negative electrode may effectively suppress growth of lithium dendrites, improve lithium deposition density during charging and discharging of a lithium metal battery, and provide improved conductivity.

When the crosslinked material 15 including the polymerizable oligomer has ionic conductivity, ions (e.g., lithium) may also be transferred through the crosslinked material 15. When the negative electrode includes such a protective layer, the negative electrode may have improved ionic conductivity.

The lithium metal alloy may include a lithium metal and a metal/metalloid alloyable with the lithium metal or an oxide of the metal/metalloid. Examples of the metal/metalloid alloyable with lithium metal or an oxide of thereof include Si, Sn, Al, Ge, Pb, Bi, Sb, a Si—Y alloy (wherein Y is an alkaline metal, an alkaline earth metal, a Group 13 to 16 element, a transition metal, a rare earth element, or a combination thereof, except for Si), a Sn—Y alloy (wherein Y is an alkaline metal, an alkaline earth metal, a Group 13 to 16 element, a transition metal, a rare earth element, or a combination thereof, except for Sn), $MnO_x$ (wherein $0<x\leq2$), or a combination thereof.

Y may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (TI), germanium (Ge), phosphorus (P), arsenic (As), antimony (Sb), bismuth (Bi), sulfur (S), selenium (Se), tellurium (Te), polonium (Po), or a combination thereof. For example, the oxide of a metal/metalloid alloyable with lithium metal may be a lithium titanium oxide, a vanadium oxide, a lithium vanadium oxide, $SnO_2$, $SiO_x$ (wherein $0<x<2$), or the like. A combination comprising at least one of the foregoing may also be used.

Referring to FIG. 1B, the particles 13 may be surrounded by an ion conductive polymer 14. Although not illustrated, the crosslinked material 15 of the polymerizable oligomer and a liquid electrolyte may be present in the gaps between the particles 13.

The ion conductive polymer 14, which may be in the protective layer 12, may surround the particles 13, as illustrated in FIG. 1B. The ion conductive polymer 14 may improve the mechanical strength of the protective layer 12 and may serve as a binder that may adhere the particles 13 to an upper surface of the lithium metal electrode 11. The amount of the ion conductive polymer 14 may be about 10 parts by weight or less, and in some embodiments, about 5 parts by weight or less, or about 2 parts by weight or less, and in some other embodiments, may be about 1 part by weight to about 10 parts by weight, or about 1 part by weight to about 5 parts by weight, or about 1 to 2 parts by weight, based on 100 parts by weight of the particles 13. When the amount of the ion conductive polymer 14 is within these ranges, the protective layer 12 may have good mechanical strength and effectively suppress growth of lithium dendrites.

The ion conductive polymer 14 may include any polymer having ionic conductivity which is suitable for use in a lithium metal battery, for example, a homopolymer, a copolymer, or a combination thereof.

For example, the homopolymer may be homopolystyrene, polyvinylidene fluoride, polymethyl methacrylate, polyvinyl alcohol, or the like. A combination comprising at least one of the foregoing may also be used.

The copolymer as the ion conductive polymer 14 may be a block copolymer, a random copolymer, a graft copolymer, an alternating copolymer, or a combination thereof.

The ion conductive polymer 14 may include polystyrene homopolymer and a block copolymer including a styrene repeating unit. For example, the ion conductive polymer 14 may include homopolystyrene, a poly(styrene-divinylbenzene) block copolymer, a poly(styrene-isoprene) block copolymer, a poly(styrene-isoprene-styrene) block copolymer, a poly(styrene-butadiene) block copolymer, a poly(styrene-butadiene-styrene) block copolymer, a poly(styrene-ethylene-butylene-styrene) block copolymer, a poly(styrene-methyl methacrylate) block copolymer, a poly(styrene-acrylonitrile) block copolymer, a poly(styrene-vinylpyridine) block copolymer, poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9 alkyl) acrylate) copolymer, or a combination thereof.

For example, the ion conductive polymer may be a poly(styrene-divinylbenzene) copolymer represented by Formula 1.

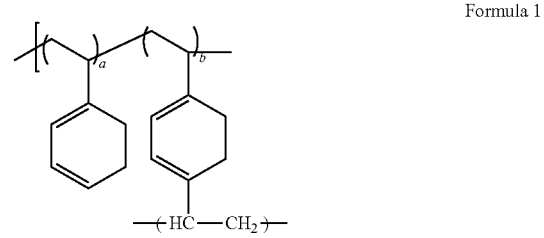

Formula 1

In Formula 1, a and b are mole fractions and are each independently from 0.01 to 0.99, wherein the sum of a and b is equal to 1. In Formula 1, a is from 0.6 to 0.99, or 0.7 to 0.96, or 0.75 to 0.90; and b is from 0.01 to 0.4, or 0.04 to 0.3, or 0.1 to 0.25.

For example, the ion conductive polymer may be a poly(styrene-divinylbenzene) copolymer represented by Formula 1a.

Formula 1a

For example, the ion conductive may be a poly(styrene-divinylbenzene) copolymer represented by Formula 1b.

Formula 1b

The poly(styrene-divinylbenzene) copolymer may include a polystyrene block and a polydivinylbenzene block in a weight ratio of about 3:1 to about 9:1, and in some embodiments, about 3:1, about 4:1, about 5:1, about 6:1, about 7:1, about 8:1, or about 9:1.

The ion conductive polymer may be a poly(acrylonitrile-butadiene-styrene) copolymer represented by Formula 2.

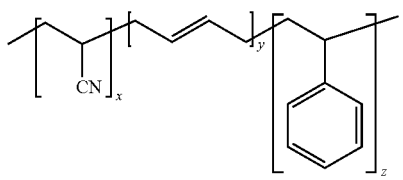

Formula 2

In Formula 2, x, y, and z as mole fractions are each independently from 0.01 to 0.99, wherein the sum of x, y, and z is equal to 1.

In Formula 2, x is from 0.1 to 0.35, y is from 0.05 to 0.55, and z is from 0.2 to 0.7. For example, x may be from 0.15 to 0.35, y may be from 0.05 to 0.3, and z may be from 0.4 to 0.6.

The poly(acrylonitrile-butadiene-styrene) copolymer may have a mixed weight ratio of a polyacrylonitrile block, a polybutadiene block, and a polystyrene block of about 0.25:0.25:0.5, or about 0.3:0.3:0.4, or about 0.2:0.2:0.6, or about 0.35:0.35:0.3, or about 0.1:0.1:0.8.

The poly(styrene-divinylbenzene) copolymer represented by Formula 1 and the poly(acrylonitrile-butadiene-styrene) copolymer represented by Formula 2 may each independently have a degree of polymerization of about 2 to about 5,000, for example, about 3 to about 2,000, or about 5 to about 1,000.

For example, the poly(styrene-divinylbenzene) copolymer represented by Formula 1 and the poly(acrylonitrile-butadiene-styrene) copolymer represented by Formula 2 may be a block copolymer.

In some embodiments, the protective layer 12 may have a single layer structure of the particles 13, as illustrated in FIGS. 1A and 1B.

In some other embodiments, the protective layer 12 may have a double layer structure in which the particles 13 are stacked as a double layer on the lithium metal electrode 11, as illustrated in FIG. 1C. As illustrated in FIG. 1B, the particles 13 stacked as a double layer may also be surrounded by the ion conductive polymer 14, and the cross-linked material 15 of the polymerizable oligomer may be disposed in the gaps between the particles 13. In some other embodiments, as illustrated in FIG. 1D, the protective layer 12 may have a multilayer structure in which particles 13a, 13b, and 13c having different sizes may be mixed together, with the crosslinked material 15 of the polymerizable oligomer disposed among the particles 13a, 13b, and 13c. When the protective layer 12 has such a multilayer structure in which the particles 13a, 13b, and 13c having different sizes are mixed together, the space for dendritic growth may be suppressed by lowering the porosity or improving the packing density of the protective layer 12, and thereby minimizing contact between the electrolyte and the lithium metal. The dendritic growth may also be suppressed by increasing the thickness of the protective layer 12.

The particles 13 in the protective layer 12 may include, for example, a poly(styrene-divinylbenzene) copolymer or a cross-linked polymer of poly(styrene-divinylbenzene) copolymer. When the particles 13 in the protective layer 12 are formed of a cross-linked polymer as described above, the particles 13 may be chemically linked to one another, and thus form a high-intensity microsphere network structure.

The protective layer 12 may have a porosity of about 5% or less, for example, about 0.01 to 5%. A pore size of the protective layer 12 may be determined depending on the size of the particles 13.

In the protective layer 12 according to any of the above-described embodiments, substantially no agglomeration of the particles 13 occurs, and as a result the protective layer 12 may have a uniform thickness. The protective layer 12 may have a thickness of about 1 μm to about 10 μm, for example, about 2 μm to about 9 μm, or about 3 μm to about 8 μm, or about 3 μm to about 5 μm. A thickness deviation of the protective layer 12 may be from about 0.1 μm to about 4 μm, and in some embodiments, about 0.1 μm to about 3 μm, and in some other embodiments, about 0.1 μm to about 2 μm.

The protective layer further include a liquid electrolyte. The liquid electrolyte includes a lithium salt and an organic solvent. The lithium salt of the liquid electrolyte in the protective layer 12 may include, for example, LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof.

The amount of the lithium salt in the protective layer 12 may be from about 10 parts by weight to about 70 parts by weight, or about 15 parts by weight to about 60 parts by weight, and in some embodiments, about 20 parts by weight to about 50 parts by weight, based on 100 parts by weight of the particles 13. When the amount of the lithium salt is within these ranges, the protective layer 12 may have good ion conductivity.

The organic solvent of the liquid electrolyte in the protective layer 12 may include a carbonate compound, a glyme compound, and a dioxolane compound. For example, the carbonate compound may be ethylene carbonate, propylene carbonate, dimethyl carbonate, fluoroethylene carbonate, diethyl carbonate, or ethyl methyl carbonate. A combination comprising at least one of the foregoing may also be used.

The glyme compound may include, for example, poly (ethylene glycol)dimethyl ether (PEGDME; polyglyme), tetra(ethylene glycol)dimethyl ether (TEGDME; tetraglyme), tri(ethylene glycol)dimethyl ether (triglyme), poly(ethylene glycol)dilaurate (PEGDL), poly(ethylene glycol)monoacrylate (PEGMA), poly(ethylene glycol)diacrylate (PEGDA), or a combination thereof.

The dioxolane compound may include, for example, 1,3-dioxolane, 4,5-diethyl-1,3-dioxolane, 4,5-dimethyl-1,3-dioxolane, 4-methyl-1,3-dioxolane, and 4-ethyl-1,3-dioxolane. For example, the organic solvent may be 2,2-dimethoxy-2-phenyl acetophenone, dimethylether (DME), 1,2-dimethoxyethane, 1,2-diethoxyethane, tetrahydrofuran, gamma-butyrolactone, 1,1,2,2-tetrafluoroethyl 2,2,3,3-tetrafluoropropyl ether, or the like, or a combination thereof.

For example, the organic solvent may include ethylene carbonate, propylene carbonate, dimethyl carbonate, diethyl carbonate, ethyl methyl carbonate, fluoroethylene carbonate, gamma-butyrolactone, 1,2-dimethoxyethane, diethoxyethane, diethylene glycol dimethyl ether, triethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, tetraethyleneglycol dimethyl ether, 1,1,2,2-tetrafluoroethyl 2,2,3,3-tetrafluoropropyl ether, or a combination thereof.

FIGS. 1E and 1F are schematic views for explaining the effects of a lithium negative electrode according to an embodiment.

Referring to FIG. 1E, a lithium negative electrode according to an embodiment may have a structure including a protective layer 12 on a lithium metal electrode 11 that has a solid-electrolyte interphase (SEI) 17 thereon, the protective layer 12 including particles 13. The lithium metal electrode 11 and the SEI 17 may have soft characteristics due to, for example, small thickness thereof, and thus be pressed by the particles 13, resulting in the formation of grooves in the lithium metal electrode 11 and the SEI 17.

The grooves may have a depth of, for example, about ±1 μm at maximum. The crosslinked material 14 including a polymerizable oligomer may be disposed in the gaps between the particles 13. Due to the presence of the crosslinked material 14, the protective layer 12 may have further improved mechanical strength.

In FIG. 1E, the particles 13 may include, for example, cross-linked polystyrene (PS) microspheres. Without being limited by theory, it is believe that the pressing force exerted by the particles 13 on the lithium metal electrode 11 and SEI 17, may suppress lithium dendritic growth and guide growth of lithium dendrites into the gaps (spaces) between the particles 13. When a negative electrode including such a protective layer as illustrated in FIG. 1E is charged, lithium deposition may occur to form a lithium deposition layer lithium deposition layer 16 on the lithium metal electrode 11, as illustrated in FIG. 1F, with the SEI 17 and the protective layer 12, which includes the particles 13 and the crosslinked material 14, being stacked in the stated order on the lithium deposition layer 16.

When using the protective layer 12, a lithium deposition density of the negative electrode may be remarkably improved as compared to a negative electrode which does not include the protective layer. In addition, the network and pore structures of the protective layer 12 may serve as spaces for dendritic growth and at the same time control the amount of dendritic growth, and finally may adsorb byproducts from a positive electrode. Thus, a lithium metal battery including such a lithium negative electrode according to any of the above-described embodiments may have improved lifetime and high-temperature stability.

In some embodiments, a lithium metal battery using a negative electrode according to any of the above-described embodiments may have a lithium deposition density of about 0.3 grams per cubic centimeter (g/cm$^3$) to about 0.4 g/cm$^3$ (g/cc), for example, about 3.12 g/cm$^3$ to about 0.4 g/cm$^3$, for example, about 0.325 g/cm$^3$ to about 0.4 g/cm$^3$, under a non-pressure condition, wherein the lithium deposition density refers to a density of lithium which is deposited on the negative electrode during charging. The term "non-pressure condition" refers to the condition in which no external pressure is applied to an external surface of the lithium metal battery by a glass plate or another substrate.

Figure 1N:
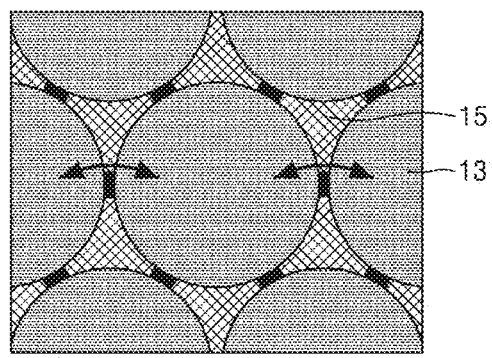
FIG. 1N is a schematic view illustrating a structure of a protective layer on a negative electrode for a lithium metal battery, according to an embodiment.

FIG. 1N is schematic view illustrating a structure of a protective layer in a negative electrode for a lithium metal battery, according to an embodiment.

Referring to FIG. 1N, particles 13 of the protective layer are connected to one another (e.g., interconnected), since pores of the protective layer may be filled with the crosslinked material. For example, about 85% or greater, about 90% or greater, about 95% or greater, about 98% or greater, or about 98% to 100% of pores in the protective layer may be filled with the crosslinked material. When the particles 13 include a block copolymer, the strength and solidity of the protective layer is substantially increased due to the interconnection between the particles.

The protective layer having the above-described structure has a strong network formed by the interconnected particles and exhibits an excellent lithium ion guiding effect, thereby effectively suppressing lithium dendrite growth on lithium metal.

In some embodiments, a lithium metal battery including a negative electrode according to any of the above-described embodiments may have a lithium deposition density which is greater than a lithium deposition density of a lithium metal battery which does not include the protective layer (i.e., a lithium metal battery using bare lithium metal as a negative electrode). The lithium metal battery may have a lithium deposition density which is at least about 50% or greater, or 55% or greater, or 58% or greater, for example, about 50% to about 75%, or about 50 to 60% greater, with respect to a lithium metal battery using bare lithium metal as a negative electrode. This remarkable improvement in lithium deposition density is attributed to the protective layer 12 having high strength in the negative electrode. The protective layer may have a Young's modulus of about $10^6$ Pa or greater, for example, about 6 to 8 gigapascals (GPa), as measured at about 25° C.

When the protective layer has a Young's modulus within these ranges, the protective layer may effectively suppress volume change in the negative electrode during charging, and the negative electrode may less likely to be partially broken by the formation of lithium dendrites on the surface of the lithium metal electrode and cause a short circuit.

An interfacial resistance between the lithium metal electrode and the protective layer, which may be obtained through an impedance measurement and using a Nyquist graph, may be decreased by at least about 10%, as measured at about 25° C., compared to bare lithium metal. The negative electrode according to any of the above-described embodiments including the protective layer for the lithium metal electrode may have lower interfacial resistance and thus better interfacial characteristics, as compared to a lithium metal electrode not including a protective layer. For example, the negative electrode may have an oxidation current or reduction current of about 0.05 milliampere per square centimeter (mA/cm$^2$) or less in a voltage range of about 0.0 volts (V) to about 6.0 V with respect to lithium metal.

When using a protective layer according to any of the above-described embodiments, a lithium metal battery may be substantially free of battery swelling issues after repeated charging and discharging. A lithium metal battery using a protective layer according to any of the embodiments may have a thickness change of about 20 μm to about 30 μm, for example about 21 μm to about 28 μm, or for example, about 22 μm to about 27 μm, after repeated charging and discharging. The thickness change may be smaller than the thickness change which occurs when using a bare lithium metal without the protective layer. For example, a lithium metal battery including a negative electrode according to any of the above-described embodiments, may have a thickness change which is at least about 20%, and in some embodiments, at least about 40%, and in some other embodiments, about 40% to about 60% less than a thickness change which occurs when using bare lithium metal without the protective layer.

Figure 9A:
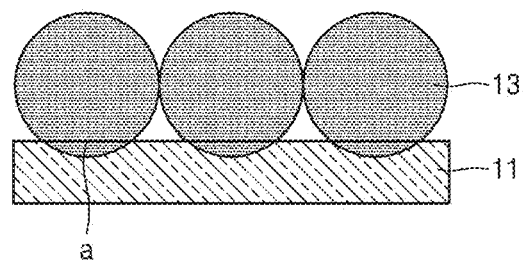
FIGS. 9A to 9C are schematic views of negative electrodes, illustrating the arrangement of particles as a protective layer on a surface of a lithium metal electrode, according to various embodiments.
Figure 9B:
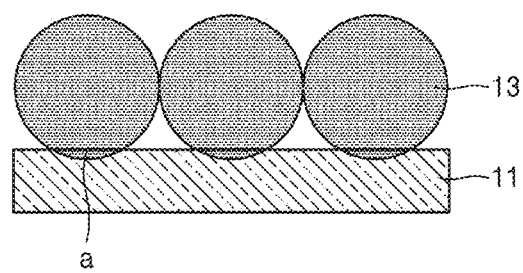
Figure 9C:
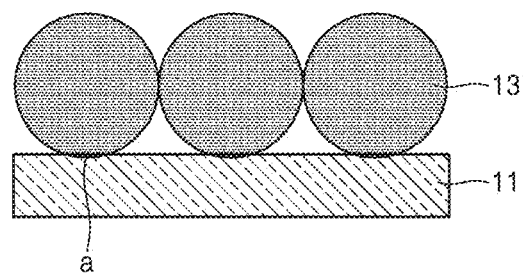

FIGS. 9A to 9C are schematic views of negative electrodes for lithium metal batteries, according to embodiments, illustrating the arrangement of microspheres on an upper surface of a lithium metal electrode 11.

Referring to FIGS. 9A, 9B, and 9C, microspheres 13 having a diameter of about 3 μm may be on the upper surface of the lithium metal electrode 11. In the embodiments of FIGS. 9A to 9C, the lithium metal electrode 11 may have a length of about 5.4 μm.

In FIGS. 9A, 9B, and 9C, a, which indicates a buried depth of the microspheres 13, may be about 1.2 μm, about 0.9 μm, and about 0.5 μm in the negative electrodes of FIGS. 9A, 9B, and 9C, respectively. In the embodiments of FIGS. 9A, 9B, and 9C, the direct contact region between the liquid electrolyte comprised in the protective layer and the lithium metal electrode may be about 33.3 volume percent (vol %), 50 vol %, and 72.2 vol %, based on a total volume of the direct contact region between the protective layer and the lithium metal electrode, respectively.

A method of manufacturing a negative electrode for a lithium metal battery, according to an embodiment, may be as follows.

First, particles having a size of greater than 1 μm to about 100 μm are mixed with a solvent to prepare a protective layer-forming composition.

The protective layer-forming composition may be coated on a lithium metal electrode and dried to form a pre-protective layer.

The solvent may be, for example, tetrahydrofuran, N-methylpyrrolidone, or the like. The amount of the solvent may be from about 100 parts by weight to about 5,000 parts by weight, based on 100 parts by weight of the particles.

An ion conductive polymer may be further added to the protective layer-forming composition.

An ionic liquid, a polymeric ionic liquid (PIL), a lithium salt, or a combination thereof may be further added to the protective layer-forming composition.

The coating may be performed using any method capable of forming a protective layer, including for example, spin coating, roll coating, curtain coating, extruding (pressing), casting, screen printing, inkjet printing, doctor blade coating, or the like.

The drying may be performed at a temperature of about 20 to 25° C. When the drying is performed at such a low temperature within this temperature range, deformation of the lithium metal electrode may not occur. A protective layer having a monodisperse single layer structure through direct coating of the protective layer-forming composition on the lithium metal electrode may be formed, thereby improving efficiency in the protective layer formation process. The resulting protective layer may also have good mechanical strength and improved ion conductivity.

After the drying, a composition including a polymerizable oligomer and a solvent may be coated on the dried pre-protective layer and then dried to thereby form a negative electrode for a lithium metal battery. The coating of the composition including the polymerizable oligomer and the solvent may occur in one step or over multiple steps (e.g., two or more). The coating may be performed using, for example, spin coating, roll coating, curtain coating, extruding (pressing), casting, screen printing, inkjet printing, doctor blade coating, or the like.

Alternatively, instead of coating, the pre-protective layer may be dipped into the composition including the polymerizable oligomer and the solvent.

In the composition including the polymerizable oligomer and the solvent, the solvent may be tetrahydrofuran, N-methylpyrrolidone, or the like. The amount of the solvent in the composition may be, for example, about 100 parts by weight to about 5000 parts, or about 150 parts by weight to about 2500 parts, or about 200 parts by weight to about 2000 parts, based on 100 parts by weight of the polymerizable oligomer. The amount of the polymerizable oligomer in the composition may be, for example, about 20 to 50 weight percent (wt %) or about 25 wt % to about 50 wt %, or about 30 wt % to about 40 wt %, based on a total weight of the composition. The amount of the polymerizable oligomer may be, for example, about 10 parts by weight to 40 parts by weight, or about 15 parts by weight to about 35 parts by weight, or about 20 parts by weight to about 30 parts by weight, based on 100 parts by weight of the particles having a particle size of greater than 1 μm and about 100 μm in the protective layer. The composition including the polymerizable oligomer and the solvent may have a viscosity of about 10 cP or less, or about 8 cP or less, or about 5 cP or less for example, about 0.1 to 10 cP, or about 0.5 cP to about 7.5 cP, or about 2 cP to about 8 cP, which may easily permeate between the particles of the pre-protective layer and fill the gaps between the particles when cast on the pre-protective layer.

In the composition including the polymerizable oligomer and the solvent, the amount of the polymerizable oligomer may be about 10 parts by weight to about 40 parts by weight, or about 10 parts by weight to about 30 parts by weight, or about 20 parts by weight to about 30 parts by weight, based on 100 parts by weight of the particles of the protective layer. When the amount of the polymerizable oligomer is within this range, the crosslinked material including the polymerizable oligomer, which is disposed in the gaps between the particles, may maintain high strength of the protective layer.

According to the above-described embodiments, a negative electrode according for a target lithium metal battery may be manufactured by coating a composition including the particles having a size of greater than 1 μm to about 100 μm or less on a lithium metal electrode to form a pre-protective layer as a stack of the particles, and casting a composition including a polymerizable oligomer and a solvent on the pre-protective layer to thereby form the negative electrode.

In some other embodiments of the method of manufacturing a negative electrode, the protective layer of the negative electrode may be formed in a single step using a composition including both the particles and the polymerizable oligomer.

During the drying process following the coating of the composition including a polymerizable oligomer and a solvent on the pre-protective layer, cross-linking of the polymerizable oligomer may occur. The drying may be performed within a range of temperatures in which no deformation of the lithium metal electrode including a lithium metal or a lithium metal alloy occurs. The drying may be performed at a temperature of, for example, about 20° C. to about 40° C. The polymerizable oligomer may be thermally crosslinked during the drying. A thermopolymerization initiator may be used to facilitate the thermal crosslinking reaction.

In some embodiments, the polymerizable oligomer may be crosslinked by light irradiation at a temperature of about 20° C. to 40° C., for example, by ultraviolet (UV) light irradiation. A photopolymerization initiator may be used to facilitate the photocrosslinking reaction.

The photopolymerization initiator may be any compound capable of forming a radical when irradiated with light such as ultraviolet (UV) light. For example, the photopolymerization initiator may include 2-hydroxy-2-methyl-1-phenyl-propane-1-one (HMPP), benzoin ether, dialkyl acetophenone, hydroxyl alkylketone, phenyl glyoxylate, benzyl dimethyl ketal, acyl phosphine, α-aminoketone, or a combination thereof. For example, the acyl phosphine may be commercially available LUCIRIN® TPO, i.e., 2,4,6-trimethyl-benzoyl-trimethyl phosphine oxide.

The thermopolymerization initiator may include a persulfate-based initiator, an azo-based initiator, an initiator including hydrogen peroxide and ascorbic acid, or a combination thereof. Non-limiting examples of the persulfate-based initiator include sodium persulfate ($Na_2S_2O_8$), potassium persulfate ($K_2S_2O_8$), ammonium persulfate (($NH_4)_2S_2O_8$), or a combination thereof. Non-limiting examples of the azo-based initiator include 2, 2-azobis(2-amidinopropane)dihydrochloride, 2,2-azobis-(N, N-dimethylene)isobutyramidine dihydrochloride, 2-(carbamoylazo)isobutyronitrile, 2,2-azobis[2-(2-imidazolin-2-yl)propane] dihydrochloride, 4,4-azobis-(4-cyanovaleric acid), and the like, or a combination thereof. A combination comprising at least one of the foregoing may also be used.

The amount of the photopolymerization initiator or thermopolymerization initiator may be about 0.005 parts by weight to about 5.0 parts by weight, or about 0.01 parts by weight to about 3 parts by weight, or about 0.5 parts by weight to about 2 parts by weight, based on 100 parts by weight of the polymerizable oligomer. When the amount of the photopolymerization initiator or thermopolymerization initiator is within this range, the degree of polymerization may be improved.

The drying of the composition including the polymerizable oligomer and the solvent on the pre-protective layer may be followed by roll-pressing. The porosity and pore size of the protective layer may be varied by the roll-pressing. The roll-pressing may further improve the current density and the lithium deposition density of a final negative electrode.

This roll-pressing is not limited and may be performed under any conditions which are suitable for manufacturing batteries. The roll-pressing may be performed, for example, at a pressure of about 1 to 1.5 kilogram force per centimeter (kgf/cm).

The protective layer may have an oxidation current or a reduction current of about 0.05 mA/cm$^2$ or less in a voltage range of about 0.0 V to about 6.0 V with respect to lithium metal. The protective layer may be electrochemically stable in a voltage range of about 0 V to 6.0 V, and in some embodiments, about 0 V to 5.0 V, and in some other embodiments, about 0 V to 4.0 V, with respect to lithium metal. In some embodiments, the protective layer may have an electrochemically stable wide voltage window, and thus may be applicable to an electrochemical device operating at a high voltage.

The at least one particle in the protective layer may be an organic particle. The organic particle may include, for example, homopolystyrene, a poly(styrene-divinylbenzene) copolymer, or a combination thereof.

The at least one particle in the protective layer may be an inorganic particle. The inorganic particle may include, for example, $SiO_2$, $TiO_2$, ZnO, $Al_2O_3$, $BaTiO_3$, or a combination thereof.

The at least one particle in the protective layer may be an organic-inorganic particle. The organic-inorganic particle may include, for example, a cage-structured silsesquioxane, a metal-organic framework (MOF), or a combination thereof.

For example, the cage-structured silsesquioxane may be a polyhedral oligomeric silsesquioxane (POSS). The number of silicon atoms in the POSS may be about 8 or less, for example, 6, 7, or 8. For example, the cage-structured silsesquioxane may be a compound represented by Formula 3.

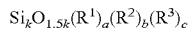

Formula 3

In Formula 3, $R^1$, $R^2$, and $R^3$ are each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In Formula 3, 0<a<20, 0<b<20, 0<c<20, and k=a+b+c, provided that a, b, and c are selected in such a way that 6≤k≤20.

The cage-structured silsesquioxane may be a compound represented by Formula 4 or a compound represented by Formula 5.

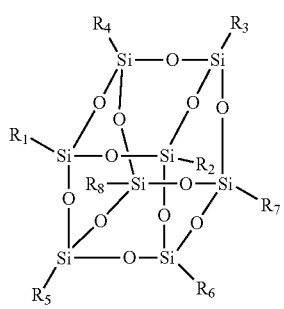

Formula 4

In Formula 4, $R_1$ to $R_8$ are each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

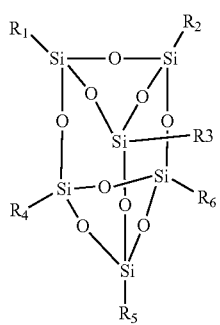

Formula 5

In Formula 5, $R_1$ to $R_6$ are each independently a hydrogen, substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In some embodiments, $R_1$ to $R_8$ in Formula 4 and $R_1$ to $R_6$ in Formula 5 may be an isobutyl group. For example, the cage-structured silsesquioxane may be octaisobutyl-t8-silsesquioxane.

The metal-organic framework (MOF) may be a porous crystalline compound in which a Group 2 to Group 15 metal ion or a Group 2 to Group 15 metal ionic cluster is chemically bonded with an organic ligand. The organic ligand refers to an organic group that may form an organic bond such as a coordinate bond, an ionic bond, or a covalent bond. For example, an organic group having at least two binding sites for metal ions such as those described above may form a stable structure through binding with the metal ions.

The Group 2 to Group 15 metal ion may include cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), bismuth (Bi), or a combination thereof. The organic ligand may be a group derived from a compound including an aromatic dicarboxylic acid, an aromatic tricarboxylic acid, an imidazole-based compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, a compound having at least one functional group selected from an amino group, an imino group, an amide group, a dithio carboxylic acid group ($—CS_2H$), a dithio carboxylate group ($—CS_2^-$), a pyridine group, and a pyrazine group, or a combination thereof. A combination comprising at least one of the foregoing may also be used.

Non-limiting examples of the aromatic dicarboxylic acid and aromatic tricarboxylic acid are benzene dicarboxylic acid, benzene tricarboxylic acid, biphenyl dicarboxylic acid, and terphenyl-dicarboxylic acid.

For example, the organic ligand may be a group originating from compounds represented by Formula 6.

Formula 6

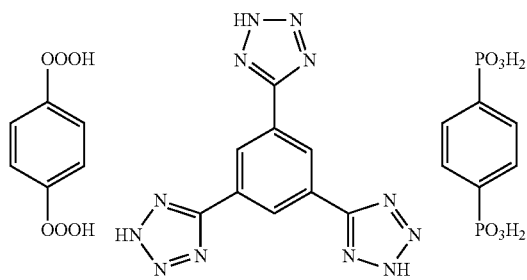

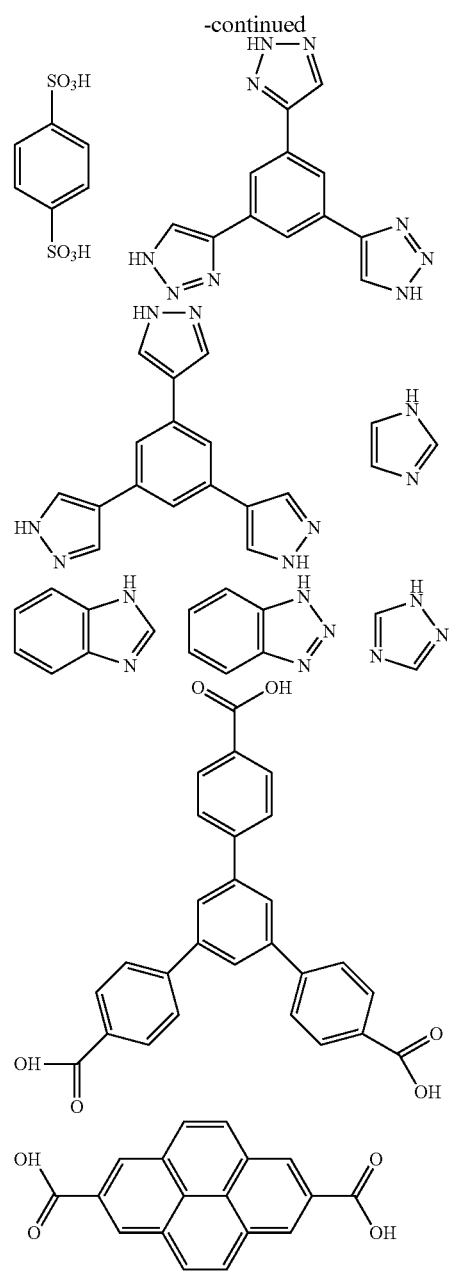

The metal-organic framework (MOF) may be, for example, $Ti_8O_8(OH)_4[O_2C—C_6H_4—CO_2]_6$, Cu (bpy) $(H_2O)_2$ $(BF_4)_2$(bpy) {bpy=4,4'-bipyridine}, $Zn_4O(O_2C—C_6H_4—CO_2)_3$ (Zn-terephthalic acid-MOF, Zn-MOF), or $Al(OH)\{O_2C—C_6H_4—CO_2\}$. A combination comprising at least one of the foregoing may also be used.

The protective layer may include: i) a particle A including a cage-structured silsesquioxane, a metal-organic framework (MOF), $Li_{1+x+y}Al_xTi_{2-x}Si_yP_{3-y}O_{12}$ (wherein 0<x<2 and 0≤y≤3), $BaTiO_3$, $Pb(Zr,Ti)O_3$ (PZT), $Pb_{1-x}La_xZr_{1-y}Ti_yO_3$ (PLZT, wherein 0≤x<1 and 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein 0<x<2 and 0<y<3), lithium aluminum titanium phosphate ($Li_xAl_yTi_z(PO_4)_3$, wherein 0<x<2, 0<y<1, and 0<z<3), $Li_{1+x+y}$(Al, Ga)$_x$(Ti, Ge)$_{2-x}$Si$_y$P$_{3-y}$O$_{12}$ (wherein 0≤x≤1 and 0≤y≤1), lithium lanthanum titanate (Li$_x$La$_y$TiO$_3$, wherein 0<x<2 and 0<y<3), lithium germanium thiophosphate (LixGeyPzSw, wherein 0<x<4, 0<y<1, 0<z<1, and 0<w<5), lithium nitride (Li$_x$N$_y$, wherein 0<x<4 and 0<y<2), a SiS$_2$ glass (Li$_x$Si$_y$S$_z$, wherein 0≤x<3, 0<y<2, and 0<z<4), a P$_2$S$_5$ glass (Li$_x$P$_y$S$_z$, wherein 0≤x<3, 0<y<3, and 0<z<7), Li$_2$O, LiF, LiOH, Li$_2$CO$_3$, LiAlO$_2$, a Li$_2$O—Al$_2$O$_3$—SiO$_2$—P$_2$O$_5$—TiO$_2$—GeO$_2$ ceramic, and a garnet ceramic (Li$_{3+x}$La$_3$M$_2$O$_{12}$, wherein (0≤x≤5), and M is Te, Nb, or Zr); ii) a cross-linked structure of the particle A having cross-linkable functional groups, or a combination thereof.

The cross-linkable functional group may be any cross-linkable functional group, for example, an acrylate group, a methacrylate group, an epoxy group, or the like.

When the at least one particle in the protective layer has a cross-linkable functional group on a surface thereof, the particles may be covalently linked so that the protective layer may have improved mechanical strength.

The ionic liquid which may be added to the protective layer-forming composition refers to a salt in a liquid state at room temperature or a fused salt at room temperature that consists of only ions having a melting point equal to or below room temperature. The ionic liquid may be a compound including: i) a cation including an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and ii) at least one anion selected from BF$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, Cl$^-$, Br$^-$, I$^-$, SO$_4^-$, CF$_3$SO$_3^-$, (FSO$_2$)$_2$N$^-$, (C$_2$F$_5$SO$_2$)$_2$N$^-$, (C$_2$F$_5$SO$_2$)(CF$_3$SO$_2$)N$^-$, (CF$_3$SO$_2$)$_2$N$^-$, or a combination thereof.

In some embodiments, the ionic liquid may include N-methyl-N-propylpyrrolidinium bis(trifluoromethylsulfonyl)imide, N-butyl-N-methyl-pyrrolidinium bis(trifluoromethylsulfonyl)imide, 1-butyl-3-methyl-imidazolium bis(trifluoromethylsulfonyl)imide, 1-ethyl-3-methyl-imidazolium bis(trifluoromethylsulfonyl)imide, or a combination thereof.

The amount of the ionic liquid may be from about 5 parts by weight to about 40 parts by weight, or from about 7.5 parts by weight to about 30 parts by weight, and in some embodiments, about 10 parts by weight to about 20 parts by weight, based on 100 parts by weight of the particles in the protective layer. When the amount of the ionic liquid is within these ranges, the protective layer may have improved ion conductivity and improved mechanical properties.

When the protective layer includes an ionic liquid (IL) and a lithium salt, the mole ratio (IL/Li) of the ionic liquid to lithium ions may be about 0.1 to 2.0, and in some embodiments, about 0.2 to 1.8, and in some other embodiments, about 0.4 to 1.5. When the mole ratio of the ionic liquid to lithium ions is within these ranges, the protective layer may have high lithium ion mobility, high ion conductivity, and improved mechanical properties to effectively suppress growth of lithium dendrite on a surface of the negative electrode.

The polymeric ionic liquid which may be added to the protective layer-forming composition may be, for example, a polymerization product of ionic liquid monomers, or a polymeric compound. The polymer ionic liquid is highly dissoluble in an organic solvent, and thus may further improve the ion conductivity of polymer layer when further added to the protective layer-forming composition.

When the polymer ionic liquid is prepared by polymerization of ionic liquid monomers as described above, a resulting product from the polymerization reaction may be washed and dried, followed by an anionic substitution reaction to have appropriate anions that may improve solubility in an organic solvent In some embodiments, the polymer ionic liquid may include a repeating unit that includes: i) a cation including an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and ii) at least one anion including BF$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, (CF$_3$SO$_2$)$_2$N$^-$, (FSO$_2$)$_2$N$^-$, Cl$^-$, Br$^-$, I$^-$, SO$_4^{2-}$CF$_3$SO$_3$, (C$_2$F$_5$SO$_2$)$_2$N$^-$, (C$_2$F$_5$SO$_2$)(CF$_3$SO$_2$)N$^-$, NO$_3^-$, Al$_2$Cl$_7^-$, (CF$_3$SO$_2$)$_3$C$^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, SF$_5$CF$_2$SO$_3^-$, SF$_5$CHFCF$_2$SO$_3^-$, CF$_3$CF$_2$(CF$_3$)$_2$CO$^-$, (CF$_3$SO$_2$)$_2$CH$^-$, (SF$_5$)$_3$C$^-$, (O(CF$_3$)$_2$C$_2$(CF$_3$)$_2$O)$_2$PO$^-$, or a combination thereof.

In some embodiments, the polymeric ionic liquid may be prepared by polymerization of ionic liquid monomers. For example, the ionic liquid monomers may have a polymerizable functional group such as a vinyl group, an allyl group, an acrylate group, or a methacrylate group, and may include a cation including an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and at least one of the above-listed anions.

Non-limiting examples of the ionic liquid monomers include 1-vinyl-3-ethylimidazolium bromide, a compound represented by Formula 7, or a compound represented by Formula 8.

Formula 7

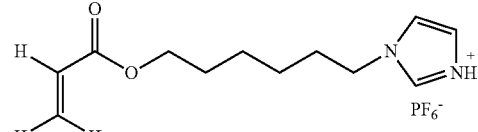

Formula 8

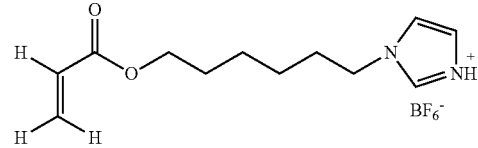

For example, the polymer ionic liquid may be a compound represented by Formula 9 or a compound represented by Formula 10.

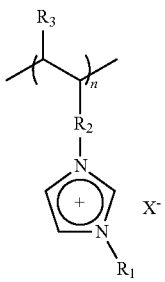

Formula 9

In Formula 9, $R_1$ and $R_3$ are each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group;

$R_2$ is a chemical bond, a C1-C30 alkylene group, a C6-C30 arylene group, a C2-C30 heteroarylene group, or a C4-C30 divalent carbocyclic group;

$X^-$ indicates an anion of the ionic liquid; and n is 500 to 2800.

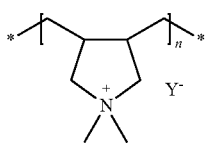

Formula 10

In Formula 10, $Y^-$ is an anion of the ionic liquid; and n is 500 to 2800.

For example, in Formula 10, $Y^-$ may be bis(trifluoromethylsulfonyl)imide (TFSI), bis(fluorosulfonyl)imide, $BF_4$, or $CF_3SO_3$.

The polymeric ionic liquid may include, for example a cation including poly(1-vinyl-3-alkylimidazolium), poly(1-allyl-3-alkylimidazolium), poly(1-(methacryloyloxy-3-alkylimidazolium), and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, $(CF_3SO_2)(CF_3CO)N^-$, or a combination thereof.

For example, the compound of Formula 10 may be poly(diallyldimethyl ammonium bis(trifluoromethylsulfonyl)imide).

In some embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethyleneglycol dimethylether (polyglyme), tetraethyleneglycol dimethyl ether (tetraglyme), and triethyleneglycol dimethylether (triglyme).

The low-molecular weight polymer may have a weight average molecular weight of about 75 Daltons to about 2000 Daltons, or about 100 Daltons to about 1000 Daltons, or for example, a weight average molecular weight of about 250 Daltons to about 500 Daltons. The thermally stable ionic liquid. may be the same as those listed above in conjunction with the above-described ionic liquid.

The protective layer may further include an oligomer. For example, the oligomer in the protective layer may include polyethylene glycol dimethyl ether, polyethylene glycol diethyl ether, or a combination thereof. The oligomer may have a weight average molecular weight of about 200 to about 2,000, or about 300 to about 1800 Daltons, or about 400 to about 1500 Daltons. The amount of the oligomer may be about 5 parts by weight to about 50 parts by weight, or about 10 parts by weight to about 40 parts by weight, or about 10 parts by weight to about 30 parts by weight, based on 100 parts by weight of the particles in the protective layer. When such an oligomer is added, the protective layer may have further improved film formability, mechanical properties, and ion conductivity characteristics.

The protective layer may have an ion conductivity as measured at about 25° C. of about $1\times10^{-4}$ Siemens per centimeter (S/cm) or greater, and in some embodiments, about $5\times10^{-4}$ S/cm or greater, and in some other embodiments, about $1\times10^{-3}$ S/cm or greater.

The protective layer of the negative electrode according to any of the above-described embodiments may be applicable to a lithium metal battery, for example, a lithium air battery, a lithium ion battery, a lithium polymer battery, a lithium sulfur battery, or the like.

In some embodiments, the protective layer may be suitable as a protective layer for a high-voltage lithium secondary battery. The term "high-voltage" refers to a charging voltage of about 4.0 V to 5.5 V.

According to another embodiment of the present disclosure, there is provided a lithium metal battery including a positive electrode, the negative electrode according to any of the above-described embodiments, and an electrolyte between the positive and negative electrodes.

The electrolyte may include a liquid electrolyte, a solid electrolyte, a gel electrolyte, a polymer ionic liquid, or a combination thereof. For example, the electrolyte may be a mixed electrolyte including at least two of these electrolytes. The lithium metal battery may further include a separator.

The electrolyte including a liquid electrolyte, a polymeric ionic liquid, a gel electrolyte, and/or a solid electrolyte may be between the positive electrode and the negative electrode. The gel electrolyte may be any gel electrolyte suitable for lithium batteries. For example, the gel electrolyte may include a polymer and a polymer ionic liquid. For example, the polymer may be a solid graft (block) copolymer electrolyte.

The solid electrolyte may be, for example, an organic solid electrolyte or an inorganic solid electrolyte. Non-limiting examples of the organic solid electrolyte are polyethylene derivatives, polyethylene oxide derivatives, polypropylene oxide derivatives, phosphoric acid ester polymer, polyester sulfide, polyvinyl alcohol, polyfluoride vinylidene, and polymers including ionic dissociative groups. A combination comprising at least one of the foregoing may also be used.

Non-limiting examples of the inorganic solid electrolyte are $Li_3N$, $LiI$, $Li_5NI_2$, $Li_3N-LiI-LiOH$, $Li_2SiS_3$, $Li_4SiO_4$, $Li_4SiO_4-LiI-LiOH$, $Li_3PO_4-Li_2S-SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ (wherein $0.1\leq x\leq 0.9$), $Li_{1+x}Hf_{2-x}Al_x(PO_4)_3$ (wherein $0.1\leq x\leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, sodium silicates, $Li_{0.3}La_{0.5}TiO_3$, $Na_5MSi_4O_{12}$ (wherein M is a rare earth element, for example, Nd, Gd, Dy, or the like) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $x\leq 0.8$, $0\leq y\leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (wherein $0<x\leq0.4$, $0<y\leq0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), and $Li_{7+x}A_xLa_{3-x}Zr_2O_{12}$ (wherein $0<x<3$ and A is Zn). A combination comprising at least one of the foregoing may also be used.

In some embodiments, the protective layer of the negative electrode in the lithium metal battery may include a metal salt containing a Group 1 or Group 2 element and a nitrogen-containing additive; boron nitride; or a combination thereof.

The metal salt containing a Group 1 or Group 2 element may include Cs, Rb, K, Ba, Fr, Ca, Na, Mg, or a combination thereof. The nitrogen-containing additive include an inorganic nitrate, an organic nitrate, an inorganic nitrite, an organic nitrite, an organic nitro compound, an organic nitroso compound, a N—O compound, a lithium nitride ($Li_3N$), or a combination thereof.

The metal salt containing a Group 1 or Group 2 element and a nitrogen-containing additive may be insoluble in an organic solvent of a liquid electrolyte. Due to the solubility characteristics, the metal salt containing a Group 1 or Group 2 element and a nitrogen-containing additive in the protective layer may be stably confined to a surface region of the lithium metal electrode with limited mobility, so that migration of lithium ions between electrodes may not be hindered when using the protective layer including the metal salt containing a Group 1 or Group 2 element and a nitrogen-containing additive therein.

The metal of the metal salt containing a Group 1 or Group 2 element has a relatively larger atom size than lithium and thus may have a steric hindrance effect in the protective layer. Due to this steric hindrance, the metal salt containing a Group 1 or Group 2 element is able to suppress growth of lithium dendrites on the surface of the lithium metal electrode. A metal cation (for example, cesium (Cs) or rubidium (Rb) ions) in the metal salt containing a Group 1 or Group 2 element may exhibit an effective reduction potential below the reduction potential of lithium ions and thus may form a positively charged electrostatic shield around the initial growth tip of protuberances formed on the surface of the lithium metal electrode without reduction or deposition of the metal salt during lithium deposition. The positively charge electrostatic shield may effectively suppress growth of lithium dendrites on the surface of the lithium metal electrode. In order for the metal salt containing a Group 1 or Group 2 element to have an effective reduction potential below the reduction potential of lithium ions as described above, the amount of the metal salt containing a Group 1 or Group 2 is within a certain range. For example, the amount of the metal salt containing a Group 1 or Group 2 element may be controlled to be within a range of about 0.1 part by weight to about 100 parts by weight, or about 1 part by weight to about 75 parts by weight, or about 10 parts by weight to about 50 parts by weight, based on 100 parts by weight of the particles in the protective layer.

The protective layer of the negative electrode in the lithium metal battery may have good mechanical strength and flexibility to suppress lithium dendritic formation. The lithium metal battery may further include an ion-conductive thin film between the lithium metal electrode and the protective layer. The ion-conductive thin film may improve the ion conductivity of the protective layer and lithium ion mobility (or lithium ion transference number), and thus reduce an interfacial resistance between the lithium metal electrode and the protective layer. For example, the ion-conductive thin film may include lithium nitride ($Li_3N$).

The protective layer of the negative electrode in the lithium metal battery may also chemically improve a deposition/dissolution process of lithium ions to thereby improve deposition morphology of the lithium metal electrode compared to when forming a conventional protective layer, and consequently increase deposition density on the surface of the lithium metal electrode and lithium ion mobility (or transference number). In addition, as described above, the at least one of a metal salt containing a Group 1 element or Group 2 element and a nitrogen-containing additive is confined to the protective layer on the surface of the lithium metal electrode, and thus is unlikely to be dispersed in the liquid electrolyte or to migrate toward the positive electrode and react with the positive electrode. As a result, the lithium metal battery including the protective layer may have improved rate capability and lifetime characteristics.

For example, the nitrogen-containing additive in the protective layer may include an inorganic nitrate, an organic nitrate, an inorganic nitrite, an organic nitrite, an organic nitro compound, an organic nitroso compound, a N—O compound, lithium nitride ($Li_3N$), or a combination thereof. However, embodiments are not limited thereto.

For example, the inorganic nitrate include lithium nitrate, potassium nitrate, cesium nitrate, barium nitrate, ammonium nitrate, or a combination thereof. For example, the organic nitrate may include dialkyl imidazolium nitrate, guanidine nitrate, ethyl nitrate, propyl nitrate, butyl nitrate, pentyl nitrate, octyl nitrate, or a combination thereof. For example, the organic nitrite may include ethyl nitrite, propyl nitrite, butyl nitrite, pentyl nitrite, octyl nitrite, or a combination thereof.

For example, the organic nitroso compound may include nitromethane, nitropropane, nitrobutane, nitrobenzene, dinitrobenzene, nitrotoluene, dinitrotoluene, nitropyridine, or a combination thereof. For example, the N—O compound may include pyridine N-oxide, alkylpyridine N-oxide, tetramethyl piperidine N-oxyl (TEMPO), or a combination thereof.

In some embodiments, the nitrogen-containing additive in the protective layer may include $LiNO_3$ o $Li_3N$, and the Group 1 element- or Group 2 element-containing metal salt in the protective layer may include cesium bis(trifluoromethylsulfonyl)imide (CsTFSI), $CsNO_3$, $CsPF_6$, CsFSI, $CsAsF_6$, $CsClO_4$, or $CsBF_4$. For example, the metal salt containing a Group 1 or Group 2 element may be CsTFSI. A combination comprising at least one of the foregoing may also be used.

The amount of the at least one of a metal salt containing a Group 1 or Group 2 element and a nitrogen-containing additive in the protective layer may be from about 0.1 part by weight to about 100 parts by weight, or about 0.1 part by weight to about 50 parts by weight, and in some embodiments, about 0.1 part by weight to about 30 parts by weight, based on 100 parts by weight of the particles in the protective layer. When the amount of the metal salt containing a Group 1 or Group 2 element and a nitrogen-containing additive is within these ranges, the lithium metal battery may have a lithium dendritic growth suppression effect, a reduced interfacial resistance between the surface of the lithium metal electrode and the protective layer, and improved lithium ion mobility.

In some embodiments, the protective layer may include only a metal salt containing a Group 1 or Group 2 element. In this regard, the amount of the metal salt containing a Group 1 or Group 2 element may be about 0.1 part by weight to about 100 parts by weight, and in some embodiments, about 0.1 part by weight to about 30 parts by weight, based on 100 parts by weight of the particles in the protective layer.

In some embodiments, the protective layer may include only a nitrogen-containing additive. In this regard, the amount of the nitrogen-containing additive may be about 0.1 part by weight to about 100 parts by weight, and in some embodiments, about 0.1 part by weight to about 30 parts by weight, based on 100 parts by weight of the particles in the protective layer.

In some other embodiments, the protective layer may include both a metal salt containing a Group 1 or Group 2 element and a nitrogen-containing additive. In this regard, the amount of the metal salt containing a Group 1 or Group 2 element may be about 0.01 part to about 99.99 parts by weight, about 0.05 part by weight to about 50 parts by weight, and in some embodiments, about 0.1 part to about 30 parts by weight, based on 100 parts by weight of the particles in the protective layer. The amount of the nitrogen-containing additive may be about 0.01 part to about 99.99 parts by weight, and in some embodiments, about 0.1 part to about 30 parts by weight, based on 100 parts by weight of the particles in the protective layer.

In some embodiments, a weight ratio of the metal salt containing a Group 1 or Group 2 element to the nitrogen-containing additive in the protective layer may be about 1:9 to about 9:1, and in some other embodiments, about 1:2 to about 2:1, and in some embodiments, about 1:1. When the weight ratio of the metal salt containing a Group 1 or Group 2 element to the nitrogen-containing additive is within these ranges, due to good deposition density on the surface of the lithium metal electrode and improved lithium ion mobility characteristics in the electrolyte, the lithium metal battery may have improved rate capability and lifetime characteristics.

The lithium metal electrode of the negative electrode in the lithium metal battery may be a lithium metal electrode a lithium metal alloy electrode. The lithium metal battery may further include a liquid electrolyte between the negative electrode and the positive electrode, the liquid electrolyte including an organic solvent, an ionic liquid, a lithium salt, or a combination thereof.

A lithium metal battery with improved capacity retention rate may be manufactured using a negative electrode according to any of the above-described embodiments. The lithium metal battery according to any one of the above-described embodiments may have good voltage characteristics, high capacity, and high energy density, and thus may be used in mobile phones, laptop computers, storage batteries for power generating units using wind power or sunlight, electric vehicles, uninterruptable power supplies (UPS), household storage batteries, and the like.

FIGS. 1G to 1J are schematic views illustrating structures of lithium metal batteries according to various embodiments.

Referring to FIG. 1G, a lithium metal battery according to an embodiment may have a structure including a positive electrode 21, a negative electrode 22 according to any of the above-described embodiments, and an electrolyte 24 between the positive electrode 21 and the negative electrode 22. A protective layer 23 may be between the electrolyte 24 and the negative electrode 22. The electrolyte 24 may include a liquid electrolyte, a polymeric ionic liquid, a solid electrolyte, a gel electrolyte, or a combination thereof. The lithium metal battery may further include a separator.

The protective layer 23 may be disposed on at least a portion of the negative electrode 22, so that the surface of the negative electrode 22 may become mechanically and electrochemically stable. As a result, during charging and discharging the lithium metal battery, dendritic formation on the surface of the negative electrode may be suppressed, and interfacial stability between the negative electrode and the electrolyte 24 may be improved. Thus, the lithium metal battery may have improved cycle characteristics.

The electrolyte 24 may have a two-layer stack structure including a liquid electrolyte 24a and a solid electrolyte 24b that may be sequentially stacked, as illustrated in FIG. 1H. The liquid electrolyte 24a may be adjacent to the protective layer 23. The lithium metal battery may have a stack structure of negative electrode/protective layer/electrolyte (liquid electrolyte/solid electrolyte)/positive electrode in the stated order.

Referring to FIG. 1L, a lithium metal battery according to another embodiment may further include a separator 24c. For example, the separator may be a monolayer including polyethylene, polypropylene, polyvinylidene fluoride, or a combination thereof, or a multilayer including at least two layers of polyethylene, polypropylene, polyvinylidene fluoride, or a combination thereof. For example, the separator may be a mixed multilayer structure, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

Referring to FIG. 1J, a lithium metal battery according to another embodiment may include a liquid electrolyte 24a. The liquid electrolyte 24a may have a composition which is the same or different as the composition of a liquid electrolyte that may be included in the protective layer 23.

FIG. 1K is a schematic view illustrating a structure of a lithium metal battery 30 according to another embodiment.

The lithium metal battery 30 may include a positive electrode 31, a negative electrode 32 according to any of the above-described embodiments, and a battery case 34 accommodating the positive electrolyte 31 and the negative electrode 32.

In the embodiments of FIGS. 1G to 1K, the positive electrode 21 may be a porous positive electrode. The porous positive electrode may be a positive electrode including pores, or any positive electrode that allows permeation of liquid electrolyte thereinto by capillary action.

For example, the porous positive electrode may be a positive electrode that may be obtained by coating a cathode active material composition including a positive active material, a conducting agent, a binder, and a solvent, and drying the resulting structure. The resulting positive electrode may include pores between the particles of the positive active material. The porous positive electrode may be impregnated with liquid electrolyte.

In some embodiments, the positive electrode may include a liquid electrolyte, a gel electrolyte, or a solid electrolyte. The liquid electrolyte, the gel electrolyte, and the solid electrolyte may be any electrolytes for lithium metal batteries that do not react with the positive active material, and thus prevent deterioration of the positive active material during charging and discharging.

Each element of a lithium metal battery including a negative electrode according to any of the embodiments, and a method of manufacturing the lithium metal battery now will be described in detail.

A positive active material for the positive electrode may include lithium cobalt oxide, lithium nickel cobalt manganese oxide, lithium nickel cobalt aluminum oxide, lithium iron phosphate, lithium manganese oxide, or a combination thereof, but is not limited thereto. Any suitable positive active material may be used.

For example, the positive active material may be a compound represented by one of the following formulae: $Li_aA_{1-b}B_bD_2$ (wherein $0.90 \le a \le 1.8$, and $0 \le b \le 0.5$); $Li_aE_{1-b}B_bO_{2-c}D_c$ (wherein $0.90 \le a \le 1.8$, $0 \le b \le 0.5$, and $0 \le c \le 0.05$); $LiE_{2-b}B_bO_{4-c}D_c$ (wherein $0 \le b \le 0.5$, and $0 \le c \le 0.05$); $Li_aNi_{1-b-c}Co_bB_cD_\alpha$ (wherein $0.90 \le a \le 1.8$, $0 \le b \le 0.5$, $0 \le c \le 0.05$, and $0 \le \alpha \le 2$); $Li_aNi_{1-b-c}Co_bB_cO_{2-\alpha}F_\alpha$ (wherein $0.90 < a < 1.8$, $0 < b < 0.5$, $0 < c < 0.05$, and $0 < \alpha \le 2$); $Li_aNi_{1-b-c}Mn_bB_cD_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ (wherein $0.90 \le a \le 1.8$, $0 \le b \le 0.5$, $0 \le c \le 0.05$, and $0 < \alpha \le 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$, and $0.001 \le b \le 0.1$); $Li_aCoG_bO_2$ (wherein $0.90 \le a \le 1.8$, and $0.001 \le b \le 0.1$); $Li_aMnG_bO_2$ (wherein $0.90 \le a \le 1.8$, and $0.001 \le b \le 0.1$); $Li_aMn_2G_bO_4$ (wherein $0.90 \le a \le 1.8$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$. A combination comprising at least one of the foregoing may also be used In the formulae above, A is nickel (Ni), cobalt (Co), manganese (Mn), or a combination thereof; B is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; F is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

For example, the positive active material may be one of the compounds represented by Formulae 11 to 14.

$$Li_aNi_bCo_cMn_dO_2 \qquad \text{Formula 11}$$

In Formula 11, $0.90 \le a \le 1.8$, $0 \le b \le 0.9$, $0 \le c \le 0.5$, and $0 \le d \le 0.5$.

$$Li_2MnO_3 \qquad \text{Formula 12}$$

$$LiMO_2 \qquad \text{Formula 13}$$

In Formula 13, M may be Mn, Fe, Co, or Ni.

$$Li_aNi_bCO_cAl_dO_2 \qquad \text{Formula 14}$$

In Formula 14, $0.90 \le a \le 1.8$, $0 \le b \le 0.9$, $0 \le c \le 0.5$, and $0 \le d \le 0.5$.

The positive electrode of the lithium metal battery may be manufactured as follows. A positive active material, a binder, and a solvent are mixed to prepare a positive active material composition. A conducting agent may be further added into the positive active material composition. The positive active material composition is directly coated on a metallic current collector and dried to prepare a positive electrode plate. Alternatively, the positive active material composition may be cast on a separate support to form a positive active material film, which may then be separated from the support and laminated on a metallic current collector to prepare a positive electrode plate.

The binder is a composition that facilitates binding between an active material and a conductive material and binding with a current collector. Non-limiting examples of the binder include polyvinylidene fluoride (PVDF), polyvinyl alcohol, carboxymethylcellulose (CMC), starch, hydroxypropylcellulose, reproduced cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, and various copolymers. An amount of the binder added may be from about 1 part by weight to about 50 parts by weight based on 100 parts by weight, or from about 2 parts by weight to about 5 parts by weight based on 100 parts by weight of the positive active material. When the content of the binder is within this range, a binding force of the positive active material layer to the current collector may be satisfactory.

The conducting agent may be any material that does not cause a chemical change in the lithium metal battery and which has electrical conductivity. Non-limiting examples of the conducting agent include graphite such as natural graphite or artificial graphite; carbonaceous materials, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whisky, such as zinc oxide or potassium titanate; a conductive metal oxide, such as a titanium oxide; and a conductive material, such as a polyphenylene derivative. A combination comprising at least one of the foregoing may also be used, The amount of the conducting agent may be from about 1 part by weight to about 10 parts by weight, for example, from about 2 parts by weight to about 5 parts by weight, based on 100 parts by weight of the positive active material. When the amount of the conducting agent is within these ranges, the final positive electrode may have good conductivity characteristics.

A non-limiting example of the solvent is N-methylpyrrolidone.

The amount of the solvent may be from about 100 parts by weight to about 2,000 parts by weight, based on 100 parts by weight of the positive active material. When the amount of the solvent is within this range, a process for forming the positive active material layer may be easily carried out.

The amounts of the positive active material, the conducting agent, the binder, and the solvent may be determined by the person of skill in the art without undue experimentation. At least one of the conducting agent, the binder, and the solvent may be omitted depending on the use and structure of a lithium metal battery.

The negative electrode may be, for example, a lithium metal thin film or a lithium metal alloy thin film, as described above.

A lithium metal alloy for the negative electrode may include lithium, and a metal/metalloid alloyable with lithium. Examples of the metal/metalloid alloyable with lithium are Si, Sn, Al, Ge, Pb, Bi, Sb, a Si—Y alloy (wherein Y is an alkaline metal, an alkaline earth metal, a Group 13 to Group 16 element, a transition metal, a rare earth element, or a combination thereof, except for Si), a Sn—Y alloy (wherein Y is an alkaline metal, an alkaline earth metal, a Group 13 to Group 16 element, a transition metal, a rare earth element, or a combination thereof, except for Sn). Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

The electrolyte may include a separator and/or a lithium salt-containing nonaqueous electrolyte which are suitable for use in lithium metal batteries in the art.

The separator may be an insulating thin film having high ion permeability and high mechanical strength. The separator may have a pore diameter of about 0.01 μm to about 10 μm, and a thickness of about 5 μm to about 20 μm. Non-limiting examples of the separator are olefin-based polymers, such as polypropylene, and sheets or non-woven fabric made of glass fiber or polyethylene. When a lithium metal battery includes a solid polymer electrolyte, the solid polymer electrolyte may also serve as the separator.

For example, the separator may be a monolayer or a multilayer including at least two layers of polyethylene, polypropylene, polyvinylidene fluoride, or a combination thereof. For example, the separator may be a mixed multi-layer, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

The lithium salt-containing nonaqueous electrolyte may include a nonaqueous electrolyte and a lithium salt. The nonaqueous electrolyte may be a nonaqueous liquid electrolyte, an organic solid electrolyte, or an inorganic solid electrolyte.

The nonaqueous liquid electrolyte may include an organic solvent. The organic solvent may be any suitable organic solvent. For example, the organic solvent may be propylene carbonate, ethylene carbonate, fluoroethylene carbonate, butylene carbonate, dimethyl carbonate, diethyl carbonate, methyl ethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, 1,3-dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof.

For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a combination thereof. For example, to improve charge-discharge characteristics and resistance to flame in a lithium metal battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, or a combination thereof, may be added to the nonaqueous electrolyte. In some embodiments, to provide nonflammable characteristics, a halogen-containing solvent such as carbon tetrachloride, ethylene trifluoride, or the like may be further added to the nonaqueous electrolyte.

For example, the lithium metal battery according to any one of the above-described embodiments may have improved capacity and improved lifetime characteristics, and thus may be used in a battery cell for use as a power source of a small device. The lithium metal battery may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

As used herein, the term "alkyl" refers to a completely saturated branched or unbranched (or straight-chained or linear) hydrocarbon group having the specified number of carbon atoms and having a valence of at least on. Non-limiting examples of the "alkyl" group include methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxyl group, a C6-C20 heteroaryloxyalkyl group, or a C6-C20 heteroarylalkyl group.

The term "halogen atom" indicates fluorine, bromine, chlorine, iodine, and the like.

As used herein, the term "alkenyl" group indicates a branched or unbranched hydrocarbon that includes at least one carbon-carbon double bond and has a valence of at least one. Non-limiting examples of the alkenyl group are vinyl, allyl, butenyl, isopropenyl, and isobutenyl. At least one hydrogen atom in the alkenyl group may be substituted with any of the substituents for the alkyl group as described above as long as the valence of the alkenyl group is not exceeded.

As used herein, the term "alkynyl" indicates a branched or unbranched hydrocarbon group with at least one carbon-carbon triple bond. Non-limiting examples of the "alkynyl" group are ethynyl, butynyl, isobutynyl, and propynyl. At least one hydrogen atom of the "alkynyl" group may be substituted with any of the substituents for the alkyl group as described above.

The term "aryl" means a cyclic group in which all ring members are carbon and at least one ring is aromatic. More than one ring may be present and any additional rings may be independently aromatic, saturated, or partially unsaturated, and may be fused, pendant, spirocyclic or a combination thereof. Non-limiting examples of the "aryl" group are phenyl, naphthyl, and tetrahydronaphthyl. At least one hydrogen atom of the "aryl" group may be substituted with any of the substituents for the alkyl group as described above.

As used herein, the term "heteroaryl" group indicates a monocyclic or bicyclic aromatic organic group that includes one or more aromatic rings, in which at least one ring member is a heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyridine-2-yl, pyridine-3-yl, pyrazine-2-yl, pyrazine-4-yl, pyrazine-5-yl, pyrimidine-2-yl, pyrimidine-4-yl, or pyrimidin-5-yl.

The term "heteroaryl" includes a heteroaromatic ring that is selectively fused to at least one of an aryl group, a cycloaliphatic group, and a heterocyclic group.

As used herein, the term "carbocyclic" group indicates a saturated or partially unsaturated non-aromatic monocyclic, bicyclic or tricyclic hydrocarbon group. Non-limiting examples of the monocyclic hydrocarbon group are cyclopentyl, cyclopentenyl, cyclohexyl, and cyclohexenyl. Non-limiting examples of the bicyclic hydrocarbon group are bornyl, decahydronaphthyl, bicyclo[2.1.1]hexyl, bicyclo[2.2.1]heptyl, bicyclo[2.2.1]heptenyl, or bicyclo[2.2.2]octyl. A non-limiting example of the tricyclic hydrocarbon group is adamantly.

As used herein, the term "heterocyclic" group indicates a C5-C20 cyclic group, for example, a C5-C10 cyclic group, including at least one hetero atom. For example, the at least one hetero atom is selected from S, N, O, and B.

As used herein, the terms "alkoxy," "aryloxy," and "heteroaryloxy," indicate alkyl, aryl, and heteroaryl groups, respectively, which are bound to an oxygen atom.

One or more embodiments of the present disclosure will now be described in detail with reference to the following examples. However, these examples are only for illustrative purposes and are not intended to limit the scope of the one or more embodiments of the present disclosure.

EXAMPLES

Example 1: Manufacture of Negative Electrode

Poly(styrene-b-divinylbenzene) block copolymer microspheres (having an average particle diameter of about 3 μm (EPR-PSD-3, available from EPRUI Nanoparticles & Microspheres Co., Ltd.) were added to anhydrous tetrahydrofuran to obtain a 5 wt % block copolymer-containing mixture.

The block copolymer in the block copolymer-containing mixture included a polystyrene block and a polydivinylbenzene block in a mixed ratio of about 9:1 by weight, and the poly(styrene-b-divinylbenzene) block copolymer had a weight average molecular weight of about 100,000 Daltons.

Lithium bis(fluorosulfonyl)imide (LiFSI, $LiN(SO_2F)_2$) was added to the block copolymer-containing mixture to obtain a protective layer-forming composition. The amount of LiFSI was about 30 parts by weight based on 100 parts by weight of the poly(styrene-b-divinylbenzene) copolymer.

The protective layer-forming composition was coated on a lithium metal thin film (having a thickness of about 20 μm) on a copper thin film to a thickness of about 3 μm with a doctor blade, dried at about 25° C., and then further dried in a vacuum at about 40° C. for about 24 hours.

Diethyleneglycol diacrylate (DEGDA) was dissolved in tetrahydrofuran to prepare a 30 wt % solution. The amount of DEGDA was about 30 parts by weight based on 100 parts by weight of the poly(styrene-b-divinylbenzene) block copolymer microspheres. The solution was cast on the resulting product from the drying and dried at about 25° C., followed by UV light irradiation at about 40° C. for about 1 hour, to thereby form a negative electrode with a protective layer including the microspheres on the lithium metal thin film and a crosslinked material of DEGDA in the gaps between the microspheres.

The amount of the crosslinked material of DEGDA was about 20 parts by weight based on 100 parts by weight of the poly(styrene-b-divinylbenzene) block copolymer microspheres.

Examples 2 and 3: Manufacture of Negative Electrode

Negative electrodes were manufactured in the same manner as in Example 1, except that the thicknesses of the protective layer were changed to about 1 μm and about 8 μm, respectively.

Example 4: Manufacture of Negative Electrode and Lithium Metal Battery

Negative electrode was manufactured in the same manner as in Example 1. The negative electrode had a protective layer including the microspheres on the lithium metal thin film and a crosslinked material of DEGDA in the gaps between the microspheres. The amount of the crosslinked material of DEGDA was about 20 parts by weight based on 100 parts by weight of the poly(styrene-b-divinylbenzene) block copolymer microspheres.

$LiCoO_2$, a conducting agent (SUPER-P®; Timcal Ltd.), polyvinylidene fluoride (PVdF), and N-methylpyrrolidone were mixed together to obtain a positive active material layer-forming composition. The mixed weight ratio of $LiCoO_2$, the conducting agent, and PVdF in the positive active material layer-forming composition was about 97:1.5:1.5. The amount of N-methylpyrrolidone was about 137 grams (g) with respect to 97 g of $LiCoO_2$.

The positive active material layer-forming composition was coated on an aluminum foil (having a thickness of about 15 μm), dried at about 25° C., and further dried in a vacuum at about 110° C., to thereby manufacture a positive electrode.

The positive electrode and the negative electrode (having a thickness of about 20 μm) manufactured according to the above-described processes were assembled with a polyethylene separator (having a porosity of about 48%) therebetween, thereby to manufacture a lithium metal battery (pouch cell). A liquid electrolyte was added between the positive electrode and the negative electrode. The liquid electrolyte was an electrolyte including 1.0 molar (M) $LiN(SO_2F)_2$ (LiFSI) in a mixed solvent of 1,2-dimethoxyethane (DME) and 1,1,2,2-tetrafluoroethyl 2,2,3,3-tetrafluoropropyl ether (TTE) in a volume ratio of electrolyte to solvent of about 2:8.

The lithium metal battery (pouch cell) manufactured through the above-described processes was not externally pressed with a glass plate and a clip.

Example 5: Manufacture of Negative Electrode and Lithium Metal Battery

A negative electrode was manufactured in the same manner as in Example 1, except that a poly(acrylonitrile-b-butadiene-b-styrene) block copolymer was further added to prepare the protective layer-forming composition.

The amount of the poly(acrylonitrile-b-butadiene-b-styrene) block copolymer was about 10 parts by weight based on 100 parts by weight of the poly(styrene-b-divinylbenzene) copolymer microspheres. The poly(acrylonitrile-b-butadiene-b-styrene) block copolymer had a weight average molecular weight of about 100,000 Daltons, wherein a mixed weight ratio of a polyacrylonitrile block, a polybutadiene block, and a polystyrene block was about 0.25:0.25:0.5.

A lithium metal battery was manufactured using the negative electrode in the same manner as in Example 4.

Example 6: Manufacture of Negative Electrode

A negative electrode was manufactured in the same manner as in Example 5, except that the amount of the poly(acrylonitrile-b-butadiene-b-styrene) block copolymer was changed to about 1 part by weight based on 100 parts by weight of the poly(styrene-co-divinylbenzene) copolymer.

Examples 7 and 8: Manufacture of Negative Electrode

Negative electrodes were manufactured in the same manner as in Example 1, except that poly(styrene-b-divinylbenzene) block copolymer microspheres having an average particle diameter of about 1.3 μm and about 50 μm were used, respectively.

Example 9: Manufacture of Lithium Metal Battery

A lithium metal battery was manufactured in the same manner as in Example 4, except that the lithium metal battery (pouch cell) of Example 4 was externally pressed with a glass plate and a clip.

Examples 10 to 16: Manufacture of Lithium Metal Battery

A negative electrode was manufactured in the same manner as in Example 4, except that the negative electrodes of Examples 2 to 8, instead of the negative electrode of Example 1, were used, respectively, and the lithium metal battery (pouch cell) of Example 4 was externally pressed with a glass plate and a clip.

Example 17: Manufacture of Negative Electrode and Lithium Metal Battery

A negative electrode was manufactured in the same manner as in Example 9, except that poly(styrene-b-divinylbenzene) block copolymer microspheres having an average particle diameter of about 5 μm were used. A lithium metal battery was manufactured using the negative electrode in the same manner as in Example 9.

Example 18: Manufacture of Lithium Metal Battery

A lithium metal battery was manufactured in the same manner as in Example 14, except that $LiNi_{0.6}Co_{0.2}Al_{0.2}O_2$, instead of $LiCoO_2$, was used to prepare the positive active material layer-forming composition.

Example 19: Manufacture of Lithium Metal Battery

A lithium metal battery was manufactured in the same manner as in Example 10, except that $LiNi_{0.6}Co_{0.2}Al_{0.2}O_2$, instead of $LiCoO_2$, was used to prepare the positive active material layer-forming composition.

Example 20: Manufacture of Negative Electrode and Lithium Metal Battery

A negative electrode was manufactured in the same manner as in Example 1, except that the poly(styrene-b-divinylbenzene) copolymer microspheres (Formula 1) having an average particle diameter of about 3 μm (as large-diameter particles, EPR-PSD-3, available from EPRUI Nanoparticles & Microspheres Co., Ltd.) and the poly(styrene-b-divinylbenzene) copolymer microspheres (Formula 1) having an average particle diameter of about 1.3 μm (as small-diameter particles) were used to prepare the 5 wt % block copolymer-including mixture of the protective layer-forming composition. A mixed weight ratio of the large-diameter particle to small-diameter particle in the protective layer-forming composition was about 8:2. The negative electrode had a protective layer including the microspheres on the lithium metal thin film and a crosslinked material of DEGDA in the gaps between the microspheres. The amount of the crosslinked material of DEGDA was about 20 parts by weight based on 100 parts by weight of the poly(styrene-b-divinylbenzene) block copolymer microspheres.

A lithium metal battery was manufactured in the same manner as in Example 14, except that the negative electrode manufactured according to the above-described process was used, instead of the negative electrode of Example 6 and $LiNi_{0.6}Co_{0.2}Al_{0.2}O_2$, instead of $LiCoO_2$, was used to prepare the positive active material layer-forming composition.

Example 21: Manufacture of Lithium Metal Battery

The electrode with a protective layer on the lithium metal thin film was manufactured in the same manner as in Example 20. The protective layer included the microspheres on the lithium metal thin film and a crosslinked material of DEGDA in the gaps between the microspheres. a negative electrode with a protective layer on the lithium metal thin film.

$LiNi_{0.6}Co_{0.2}Al_{0.2}O_2$, a conducting agent (SUPER-P®; Timcal Ltd.), PVdF, and N-methylpyrrolidone were mixed together to obtain a positive active material layer-forming composition. A mixed weight ratio of $LiNi_{0.6}Co_{0.2}Al_{0.2}O_2$, the conducting agent, and PVDF in the positive active material layer-forming composition was about 97:1.5:1.5.

The positive active material layer-forming composition was coated on an aluminum foil (having a thickness of about 15 μm), dried at about 25° C., and further dried in a vacuum at about 110° C., thereby to manufacture a positive electrode.

The positive electrode and the negative electrode (having a thickness of about 20 μm) manufactured according to the above-described processes were assembled with a polyethylene separator (having a porosity of about 48%) therebetween, thereby to manufacture a lithium metal battery (pouch cell). A liquid electrolyte was added between the positive electrode and the negative electrode. The liquid electrolyte was an electrolyte including 1.0M $LiN(SO_2F)_2$ (LiFSI) in a mixed solvent of 1,2-dimethoxyethane (DME) and 1,1,2,2-tetrafluoroethyl 2,2,3,3-tetrafluoropropyl ether (TTE) in a volume ratio of about 2:8.

Example 22: Manufacture of Negative Electrode and Lithium Metal Battery

A negative electrode was manufactured in the same manner as in Example 5, except that a poly(styrene-b- isoprene-b-styrene) block copolymer, instead of the poly (acrylonitrile-b-butadiene-b-styrene) block copolymer, was used. A mixed weight ratio of a polystyrene block, a polyisoprene block, and a polystyrene block in the poly(styrene-b-isoprene-b-styrene) block copolymer was about 22:56:22.

A lithium metal battery was manufactured using the negative electrode in the same manner as in Example 19.

Example 23: Manufacture of Negative Electrode and Lithium Metal Battery

A negative electrode was manufactured in the same manner as in Example 9, except that a 1:1 mixture (by weight) of poly(styrene-b-divinylbenzene) copolymer microspheres having an average particle diameter of about 3 μm and poly(styrene-b-divinylbenzene) copolymer microspheres having average particle diameter of about 8 μm, instead of the poly(styrene-b-divinylbenzene) block copolymer microspheres having an average particle diameter of about 3 μm, was used. A lithium metal battery was manufactured using the negative electrode in the same manner as in Example 9.

Example 24: Manufacture of Negative Electrode and Lithium Metal Battery

A negative electrode was manufactured in the same manner as in Example 1, except that a poly(styrene-b-divinylbenzene) block copolymer with a 4:1 weight ratio of a polystyrene block and a polydivinylbenzene block, instead of the poly(styrene-b-divinylbenzene) block copolymer with a 9:1 weight ratio of a polystyrene block and a polydivinylbenzene block, was used. A lithium metal battery was manufactured using the negative electrode in the same manner as in Example 9.

Example 25: Manufacture of Negative Electrode

A negative electrode was manufactured in the same manner as in Example 1, except that poly(styrene-b-divinylbenzene) block copolymer microspheres having an average particle diameter of about 8 μm were used. A lithium metal battery was manufactured using the negative electrode in the same manner as in Example 9.

Examples 26 and 27: Manufacture of Negative Electrode and Lithium Metal Batteries Negative electrodes were manufactured in the same manner as in Example 1, except that poly(styrene-b-divinylbenzene) block copolymer microspheres including a polystyrene block and a polydivinylbenzene block in a mixed weight ratio of about 98:2 (49:1) or 95:1, instead of 9:1, were used. Lithium metal batteries were manufactured using these negative electrodes in the same manner as in Example 9.

Example 28: Manufacture of Negative Electrode and Lithium Metal Battery

A negative electrode was manufactured in the same manner as in Example 1, except that poly(styrene-b-divinylbenzene) block copolymer microspheres having an average particle diameter of about 9 μm were used. A lithium metal battery was manufactured using the negative electrode in the same manner as in Example 9.

Comparative Example 1: Manufacture of Negative Electrode and Lithium Metal Battery $LiCoO_2$, a conducting agent (Super-P; Timcal Ltd.), PVdF, and N-methylpyrrolidone were mixed together to obtain a positive electrode composition. A mixed weight ratio of $LiCoO_2$, the conducting agent, and PVdF in the positive electrode composition was about 97:1.5:1.5.

The positive electrode composition was coated on an aluminum foil (having a thickness of about 15 μm), dried at about 25° C., and further dried in a vacuum at about 110° C., thereby to manufacture a positive electrode.

The positive electrode manufactured according to the above-described processes and a lithium metal electrode (having a thickness of about 20 μm) were assembled with a polyethylene separator (having a porosity of about 48%) therebetween, thereby to manufacture a lithium metal battery (coin cell). A liquid electrolyte was added between the positive electrode and the lithium metal electrode.

The liquid electrolyte was an electrolyte including 1.0M $LiN(SO_2F)_2$ (LiFSI) in a mixed solvent of 1,2-dimethoxyethane (DME) and 1,1,2,2-tetrafluoroethyl 2,2,3,3-tetrafluoropropyl ether (TTE) in a volume ratio of about 2:8.

Comparative Example 2: Manufacture of Negative Electrode and Lithium Metal Battery Polystyrene was added to anhydrous tetrahydrofuran to obtain a 5 wt %-polystyrene-including mixture. The polystyrene had a weight average molecular weight of about 100,000 Daltons.

Lithium bis(fluorosulfonyl)imide (LiFSI, $LiN(SO_2F)_2$) was added to the polystyrene-including mixture to obtain a protective layer-forming composition. The amount of LiFSI was about 30 parts by weight based on 100 parts by weight of the polystyrene.

The protective layer-forming composition was coated on a lithium metal thin film (having a thickness of about 20 μm) to a thickness of about 3 μm with a doctor blade, dried at about 25° C., and then further dried in a vacuum at about 40° C. for about 24 hours, thereby to form a negative electrode with a protective layer on the lithium metal thin film.

A lithium metal battery was manufactured using the negative electrode in the same manner as in Comparative Example 1.

Comparative Examples 3 and 4: Manufacture of Negative Electrode and Lithium Metal Battery Negative electrodes with protective layer were manufactured in the same manner as in Example 1, except that poly(styrene-b-divinylbenzene) block copolymer microspheres having an average particle diameter of about 1 μm and about 0.2 μm, were used, respectively, to obtain the protective layer-forming composition. Lithium metal batteries were also manufactured in the same manner as in Comparative Example 1.

Comparative Example 5: Manufacture of Negative Electrode and Lithium Metal Battery A lithium metal battery was manufactured in the same manner as in Comparative Example 1, except that $LiNi_{0.6}Co_{0.2}Al_{0.2}O_2$, instead of $LiCoO_2$, was used to manufacture the positive electrode.

Comparative Examples 6 and 7: Manufacture of Negative Electrode and Lithium Metal Battery Negative electrodes were manufactured in the same manner as in Example 1, except that alumina ($Al_2O_3$) having an average particle diameter of about 10 nm (0.01 μm) and alumina ($Al_2O_3$) having an average particle diameter of about 50 nm (0.05 μm) were used, respectively, instead of poly(styrene-b-divinylbenzene) block copolymer microspheres, to prepare protective layer-forming compositions. Lithium metal batteries were manufactured using these negative electrodes, respectively, in the same manner of Comparative Example 1.

Evaluation Example 1: Scanning Electron Microscopic (SEM) Analysis

1) Example 1

Surface and cross-sectional statuses of the negative electrode of Example 1 were analyzed using a scanning electron microscope (Hitachi SU-8030).

Figure 2A:
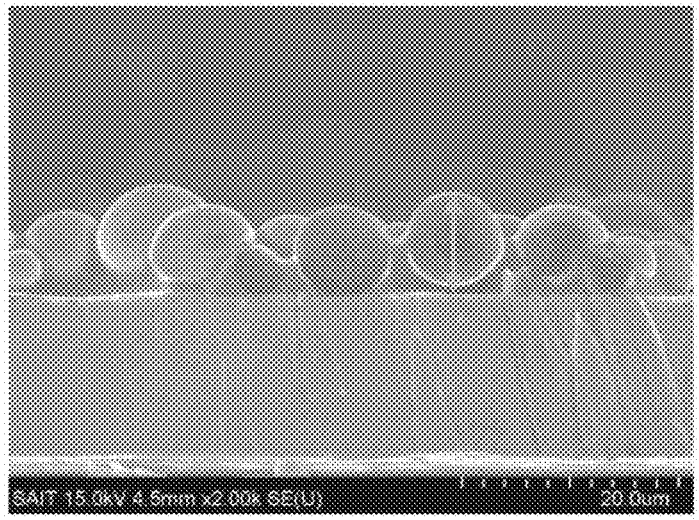
FIGS. 2A to 2D are scanning electron microscopic (SEM) images of a cross-section of the negative electrode of Example 1.
Figure 2B:
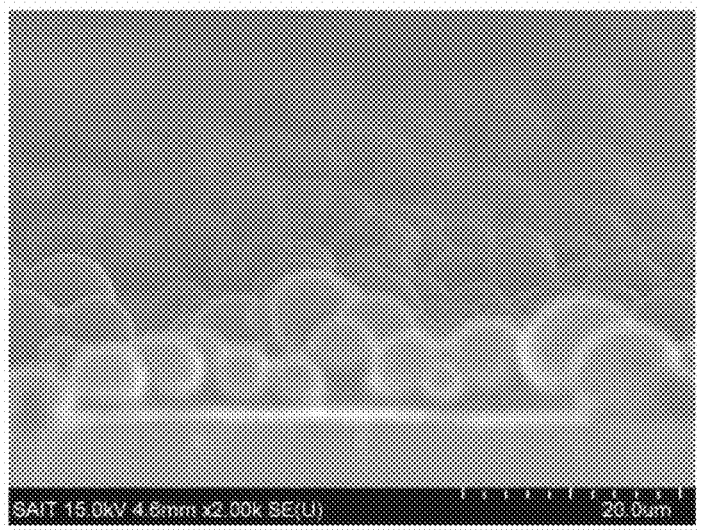
Figure 2C:
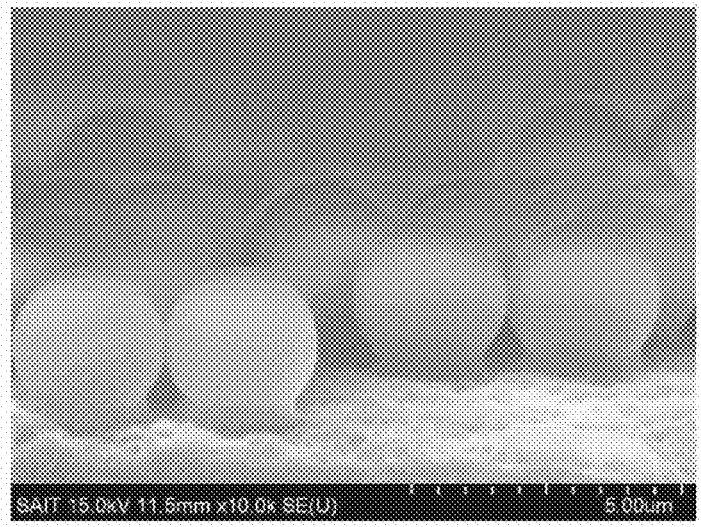
Figure 2D:
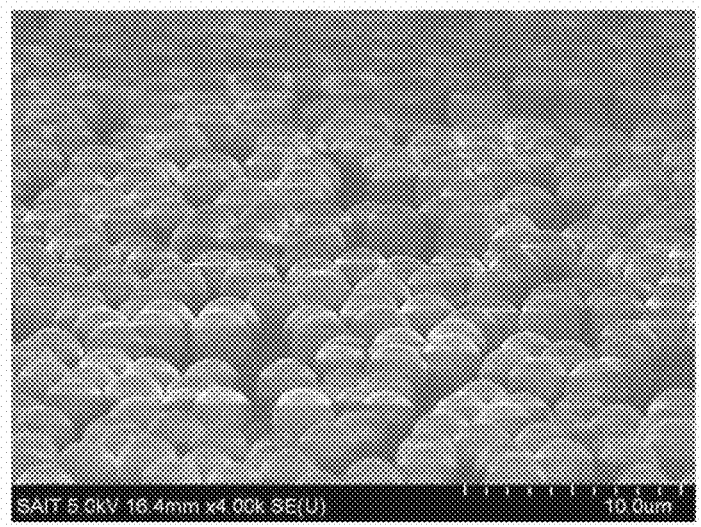

SEM images of the negative electrode of Example 1 are shown in FIGS. 2A and 2B.

Referring to FIGS. 2A and 2B, the protective layer of the negative electrode of Example 1 was found to have a single layer structure of microspheres on a surface of the lithium metal thin film, and no aggregation of the microspheres was found.

The negative electrode of Example 1 was also analyzed using scanning electron microscopy/energy dispersive spectroscopy (SEM/EDS). As a result the negative electrode of Example 1 was found to include an oxygen component originating from the crosslinked material of DEGDA in the protective layer.

2) Example 5

A surface status of the negative electrode of Example 5 was analyzed using SEM. The results are shown in FIGS. 3A, 3B, and 3C.

Figure 3A:
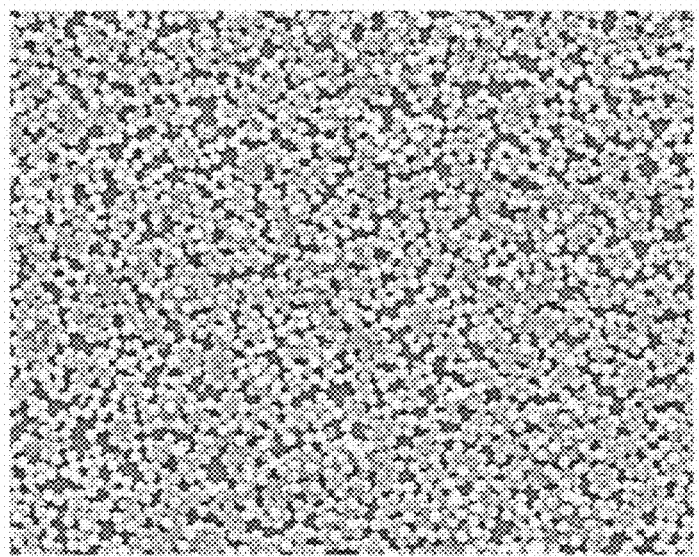
FIGS. 3A, 3B, and 3C are SEM images of a surface of the negative electrode of Example 4.
Figure 3B:
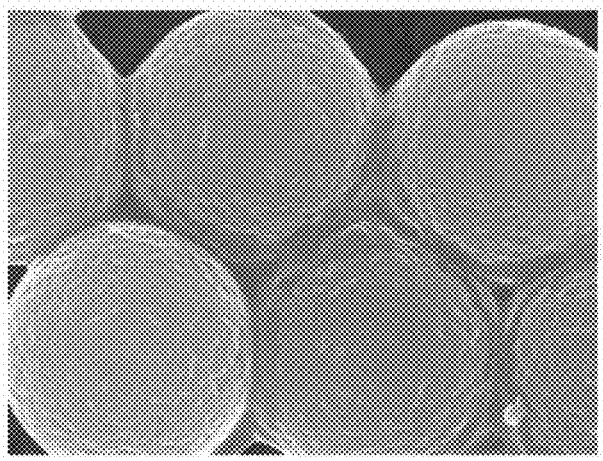
Figure 3C:
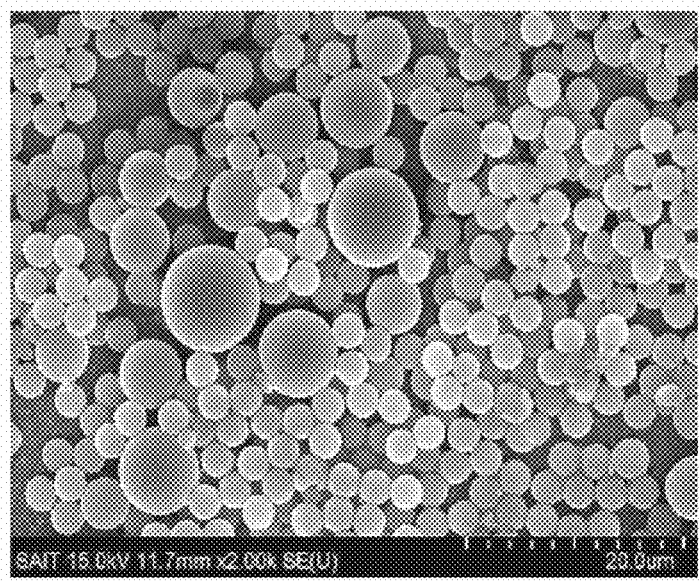

Referring to FIGS. 3A to 3C, in the negative electrode of Example 5, the protective layer on a surface of the lithium metal thin film was found to have a monodisperse single layer structure of microspheres in closed packed arrangement, and no aggregation of the microspheres was found.

3) Example 23

Surface status of the negative electrode of Example 23 was analyzed using SEM. An SEM image of the negative electrode of Example 23 is shown in FIG. 3F.

Figure 3D:
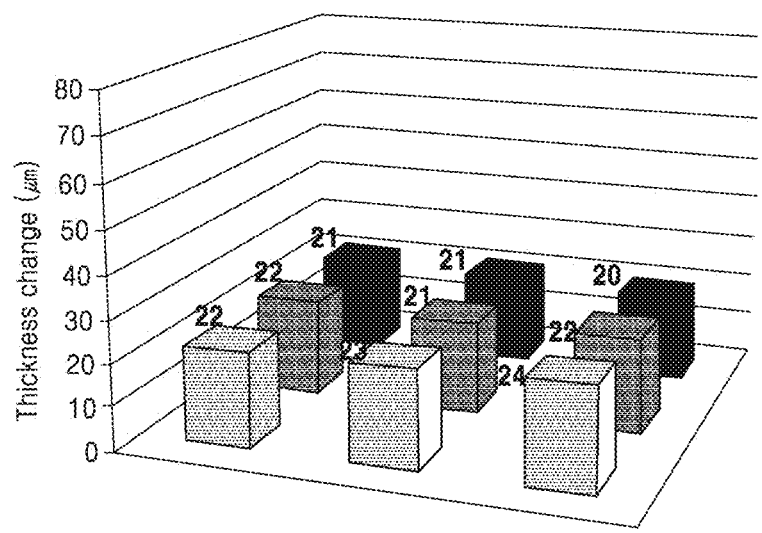
FIGS. 3D and 3E are graphs of the change in thickness (micrometers, μm) at different measurement points in the lithium metal batteries of Example 10 and Comparative Example 1, respectively, which show the deviation in thickness deviation of the lithium deposited layer on the lithium metal negative electrode of each of the lithium metal batteries.
Figure 3E:
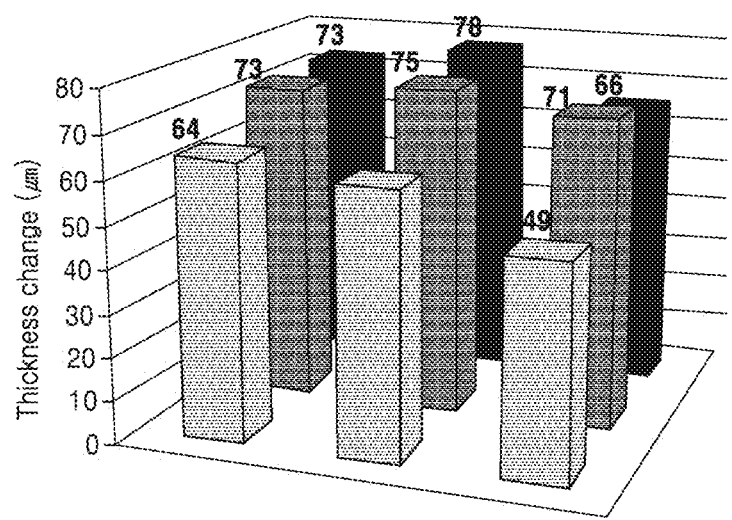
Figure 3F:
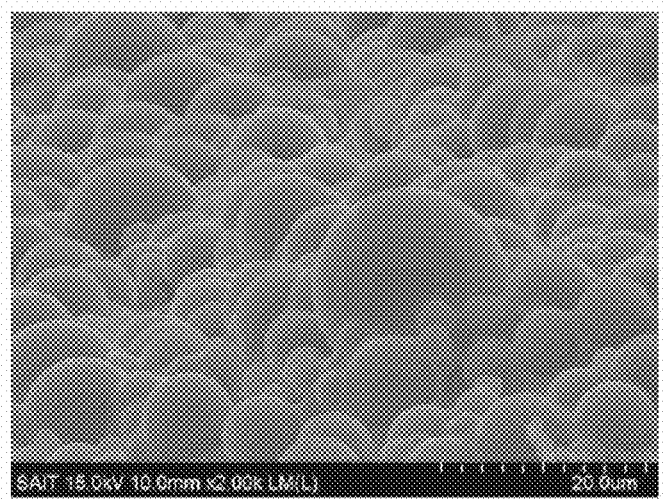
FIG. 3F is a SEM image of the negative electrode of Example 23.

Referring to FIG. 3F, the negative electrode of Example 23 was found to include uniformly dispersed microspheres of the two different sizes on the lithium metal thin film.

Evaluation Example 2: Lithium Deposition Density and SEM Analysis

1) Example 10, Example 19, Example 20, Comparative Example 1, and Comparative Example 2

Each of the lithium metal batteries of Examples 10, 19, and 20, and Comparative Example 1, and Comparative Example 2 was charged with a constant current of 0.1 C (0.38 mA/cm²) at about 25° C. until a voltage of about 4.40 V (with respect to Li), and maintained at a constant voltage of 4.40 V (constant voltage mode) until a cutoff current of 0.05 C rate. This one-time charging was followed by measuring external pouch thickness changes in the lithium metal batteries with a lithium micrometer. The results are shown in Table 1. Lithium deposition density was also evaluated by measuring the thickness of the lithium deposition layer on the negative electrode of each of the lithium metal batteries and a thickness deviation thereof. The results are shown in Table 2.

TABLE 1

| Example | External pouch thickness change (μm) |
| --- | --- |
| Example 10 | 27 |
| Example 19 | 23 |
| Example 20 | 22 |
| Comparative Example 1 | 68 |

Referring to Tables 1 and 2, the lithium metal batteries of Examples 10, 19, and 20 were found to have a smaller change in thickness and a reduced thickness deviation of the lithium deposition layer, compared to the lithium metal battery of Comparative Example 1.

TABLE 2

| Example | Lithium deposition density (g/cc) | Thickness of lithium deposition layer (μm) | Thickness deviation of lithium deposition layer (μm) |
| --- | --- | --- | --- |
| Example 10 | 0.334 | 27 | ±3 |
| Example 19 | 0.325 | 23 | ±3 |
| Example 20 | 0.343 | 22 | ±3 |
| Comparative Example 1 | 0.113 | 68 | ±10 |
| Comparative Example 2 | 0.262 | 29 | ±5 |

Referring to Table 2, the lithium metal batteries of Examples 10, 19, and 20 were found to have a higher lithium deposition density, compared to the lithium deposition density of the lithium metal battery of Comparative Examples 1 and 2.

2) Example 13 and Comparative Example 1

Figure 4A:
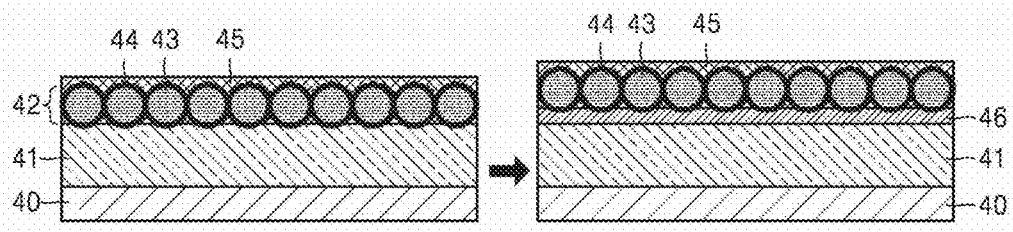
FIG. 4A is a schematic view illustrating a cross-sectional structure of a negative electrode with a lithium deposited layer thereon in the lithium metal battery of Example 13.
Figure 5A:
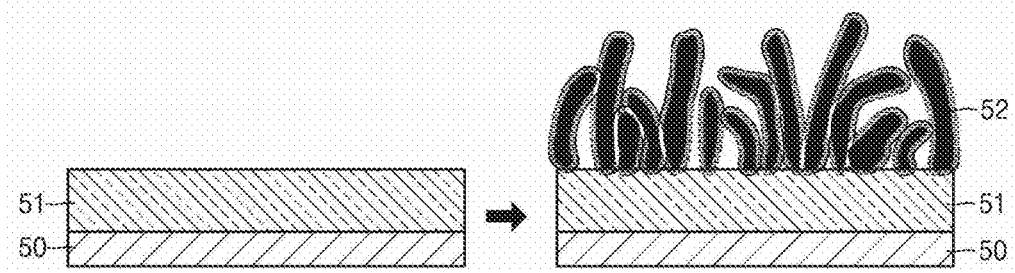
FIG. 5A is a schematic view illustrating a cross-sectional structure of the negative electrode in the lithium metal battery of Example 13.

Surface and cross-sectional statuses of the negative electrodes in the lithium metal batteries of Examples 13 and Comparative Example 1 were analyzed using scanning electron microscopy (SEM). FIG. 4A is a schematic view illustrating a cross-sectional structure of the negative electrode with a lithium deposition layer of the lithium metal battery of Example 3. FIG. 5A is a schematic view illustrating a cross-sectional structure of the lithium metal battery of Comparative Example 1.

Referring to FIG. 5A, in the negative electrode of the lithium metal battery of Comparative Example 1, a lithium metal electrode 51 was stacked on a negative electrode current collector 50, and lithium dendrites 52 were randomly formed on the lithium metal electrode 51. On the other hand, in the lithium metal battery of Example 13, a lithium metal electrode 41 was stacked on a negative electrode current collector 40 such as a copper foil, with a protective layer 42 on the lithium metal electrode 41, the protective layer 42 including particles 43 and a crosslinked material 45 of a polymerizable oligomer in the gaps between the particles 43, as illustrated in FIG. 4A. A lithium deposition layer 46 was between the lithium metal electrode 41 and the protective layer 42.

Figure 4B:
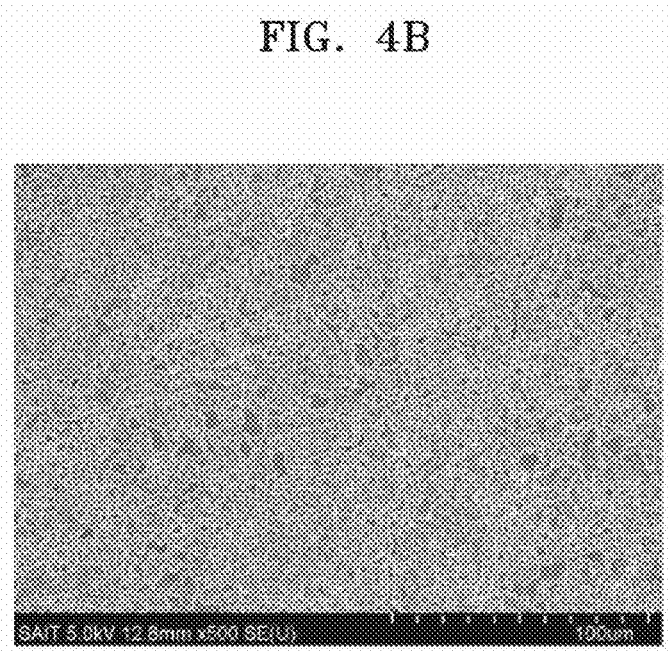
FIGS. 4B and 4C are SEM images of a surface of the negative electrode in the lithium metal battery of Example 1.
Figure 4C:
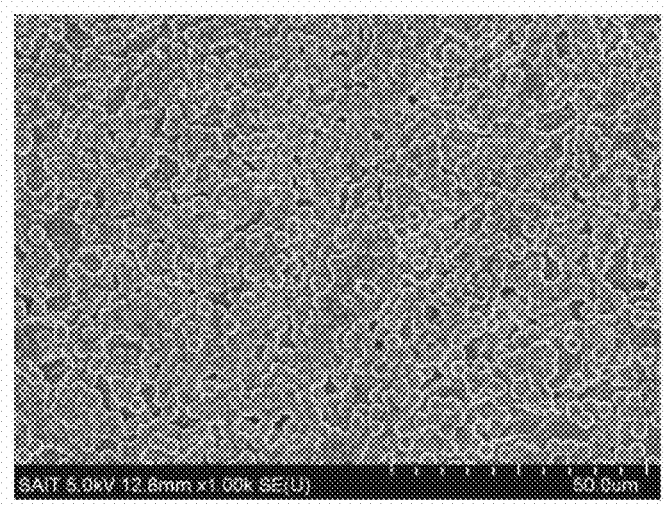
Figure 5B:
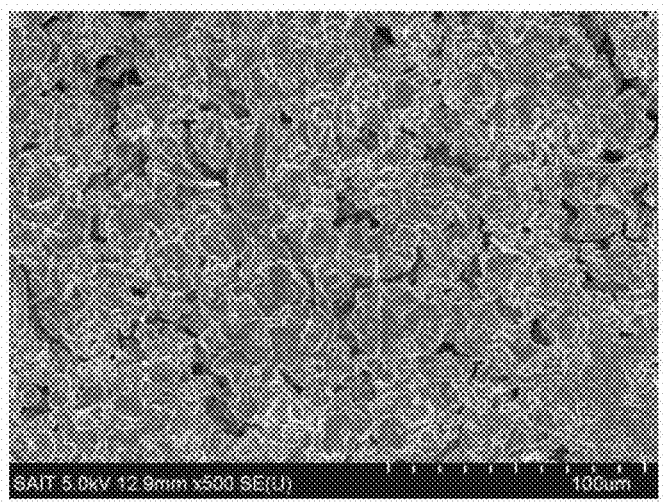
FIGS. 5B and 5C are SEM images of a surface of the negative electrode in the lithium metal battery of Comparative Example 1.
Figure 5C:
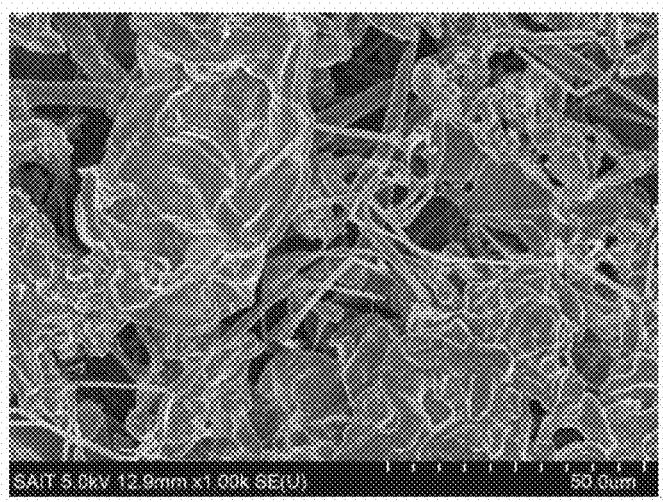

SEM images of the negative electrode in the lithium metal battery of Example 13 are shown in FIGS. 4B and 4C. SEM images of the negative electrode in the lithium metal battery of Comparative Example 1 are shown in FIGS. 5B and 5C.

Referring to FIGS. 4B, 4C, 5B, and 5C, nearly no lithium dendrites were found in the lithium metal battery of Example 13, while considerable growth of lithium dendrites was observed in the lithium metal battery of Comparative Example 1.

Figure 4D:
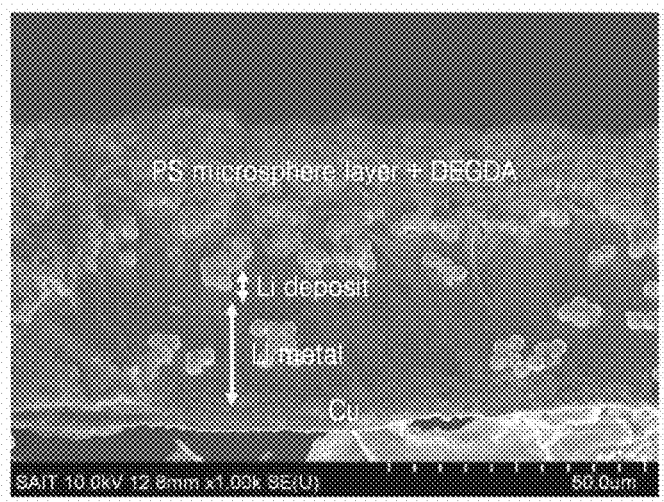
FIG. 4D is a SEM image of a cross-section of the lithium metal battery of Example 9, which shows a lithium deposit layer formed on the negative electrode of the lithium metal battery.
Figure 5D:
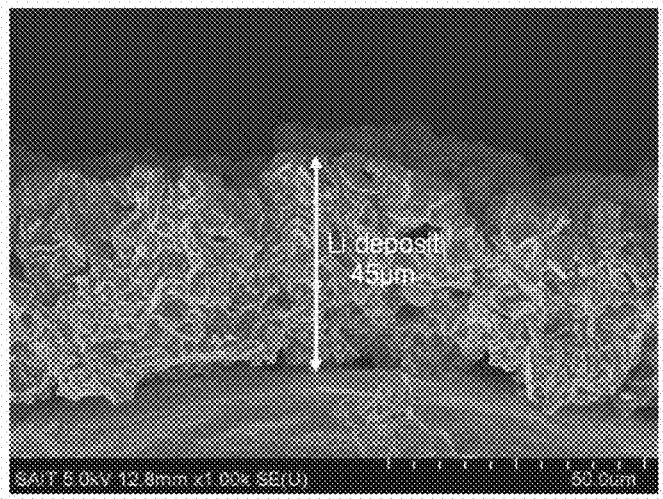
FIG. 5D is a SEM image of a cross-section of the lithium metal battery of Comparative Example 1, illustrating a lithium deposition layer formed on the negative electrode of the lithium metal battery.

Referring to FIGS. 4D and 5D, the negative electrode of Example 13 was found to have a structure with a fairly dense lithium deposition layer on the lithium metal thin film, unlike the negative electrode of Comparative Example 1.

3) Example 9, Example 15, Example 17, Example 28, Comparative Example 6, and Comparative Example 7

Each of the lithium metal batteries of Example 9, Example 15, Example 17, Example 28, Comparative Example 6, and Comparative Example 7 was charged with a constant current of 0.1 C (0.38 mA/cm$^2$) at about 25° C. until a voltage of about 4.40 V (with respect to Li), and maintained at a constant voltage of 4.40 V (constant voltage mode) until a cutoff current of 0.05 C rate. This one-time charging was followed by measuring external pouch thickness changes in the lithium metal batteries with a lithium micrometer. The lithium deposition density was calculated from change in external pouch thickness. The thickness of each lithium deposition layer was measured by SEM after disassembling a cell.

The results of lithium deposition density, the thickness of the lithium deposition layer on the negative electrode of each of the lithium metal batteries and a thickness deviation thereof are shown in Table 3.

TABLE 3

| Example | Lithium deposition density (g/cc) (g/cm$^3$) | External pouch thickness change (μm) | Thickness of lithium deposition layer (μm) | Thickness deviation of lithium deposition layer (μm) |
|---|---|---|---|---|
| Example 9 P(S-DVB) 3 μm | 0.343 | 21-23 | 19-21 | ±2 |
| Example 15 P(S-DVB) 1.3 μm | 0.32-0.33 | 22-24 | 20-22 | ±2 |
| Example 17 P(S-DVB) 5 μm | 0.32-0.33 | 22-24 | 20-22 | ±2 |
| Example 28 P(S-DVB) 9 μm | 0.31-0.32 | 23-26 | 21-24 | ±3 |
| Comparative Example 6 Al$_2$O$_3$ 10 nm | 0.255-0.265 | 29-32 | 27-30 | ±3 |
| Comparative Example 7 Al$_2$O$_3$ 50 nm | 0.25 | 29-33 | 28-31 | ±3 |

Referring to Table 3, the lithium metal batteries of Example 9, Example 15, Example 17, and Example 28 were found to have a reduced change in external pouch thickness, a reduced change in lithium deposition layer thickness, a reduced thickness deviation of the lithium deposition layer, and an increased lithium deposition density, as compared to the lithium metal batteries of Comparative Examples 6 and 7.

4) Example 18, Example 20, Comparative Example 6, and Comparative Example 7

Each of the lithium metal batteries of Example 18, Example 20, Comparative Example 6, and Comparative Example 7 was charged with a constant current of 0.1 C (0.38 mA/cm$^2$) at about 25° C. until a voltage of about 4.40 V (with respect to Li), and maintained at a constant voltage of 4.40 V (constant voltage mode) until a cutoff current of 0.05 C rate. This one-time charging was followed by measuring external pouch thickness changes in the lithium metal batteries with a lithium micrometer. The lithium deposition density was calculated from change in external pouch thickness. The thickness of each lithium deposition layer was measured by SEM after disassembling a cell.

The results of lithium deposition density, the thickness of the lithium deposition layer on the negative electrode of each of the lithium metal batteries and a thickness deviation thereof are shown in Table 4.

TABLE 4

| Example | Lithium deposition density (g/cc) (g/cm$^3$) | External pouch thickness change (μm) | Thickness of lithium deposition layer (μm) | Thickness deviation of lithium deposition layer (μm) |
|---|---|---|---|---|
| Example 18 P(S-DVB) 3 μm | 0.343 | 21-23 | 19-21 | ±2 |
| Example 20 P(S-DVB) (3 μm + 1.3 μm) | 0.356 | 20-22 | 18-20 | ±2 |
| Comparative Example 6 Al$_2$O$_3$ 10 nm | 0.255-0.265 | 29-32 | 27-30 | ±3 |
| Comparative Example 7 Al$_2$O$_3$ 50 nm | 0.25 | 29-33 | 28-31 | ±3 |

Referring to Table 4, the lithium metal batteries of Examples 18 and 20 were found to have a reduced change in external pouch thickness, a reduced change in lithium deposition layer thickness, a reduced deviation of the thickness of the lithium deposition layer, and an increased lithium deposition density, as compared to the lithium metal batteries of Comparative Examples 6 and 7.

Evaluation Example 3: Lithium Deposition Density

Each of the lithium metal batteries of Example 10 and Comparative Example 1 was charged with a constant current of 0.1 C (0.38 mA/cm$^2$) at about 25° C. until a voltage of about 4.40 V (with respect to Li), and maintained at a constant voltage of 4.40 V (constant voltage mode) until a cutoff current of 0.05 C rate. This one-time charging was followed by measuring external pouch thickness changes at different measurement points in the lithium metal batteries and a thickness deviation in the lithium deposition layer on the lithium metal negative electrode of each of the lithium metal batteries, with a lithium micrometer. The results are shown in Table 1. A distribution of the lithium deposition layer thickness change at different measurement points on each of the lithium metal negative electrodes was evaluated. The distribution of the thickness change in the lithium metal batteries of Example 10 and Comparative Example 1 is shown in FIGS. 3D and 3E, respectively. Referring to FIGS. 3D and 3E, the lithium metal battery of Example 10 was found to have a lithium deposition layer grown to a more uniform thickness, as compared to the lithium metal battery of Comparative Example 1.

Evaluation Example 4: Monitoring of Cell Thickness Change with Repeating Charge-Discharge Cycles Each of the lithium metal batteries of Example 20 and Comparative Example 1 was charged at about 25° C. with a constant current of 0.1 C rate to a voltage of about 4.40 Volts (V) (with respect to Li), and then with a constant voltage of 4.40 V until a cutoff current of 0.05 C rate, and was then discharged with a constant current of 0.1 C rate to a voltage of about 2.8 V (with respect to Li) (Formation process, $1^{st}$ cycle). This cycle of charging and discharging was performed two times more to complete the formation process.

Each of the lithium metal batteries after the formation process was charged at room temperature (25° C.) with a constant current of 0.7 C to a voltage of about 4.4 V (with respect to Li) and then discharged with a current of 0.5C until a cutoff voltage of 3.0 V.

This cycle of charging and discharging was performed 35 times in total.

Cell thickness change with repeating charge-discharge cycles was monitored. As a result, the lithium metal battery of Example 20 was found to have a reduced cell thickness change, compared to the lithium metal battery of Comparative Example 1.

Evaluation Example 5: Impedance Measurement

Impedance measurements on the lithium metal batteries of Examples 18 and 20 and Comparative Example 1 were performed by measuring resistance at about 25° C. according to a 2-probe method with a Solartron 1260A Impedance/Gain-Phase Analyzer) in a frequency range of about 0.1 Hz to about 1 MHz and an amplitude of about ±10 mV.

Figure 6:
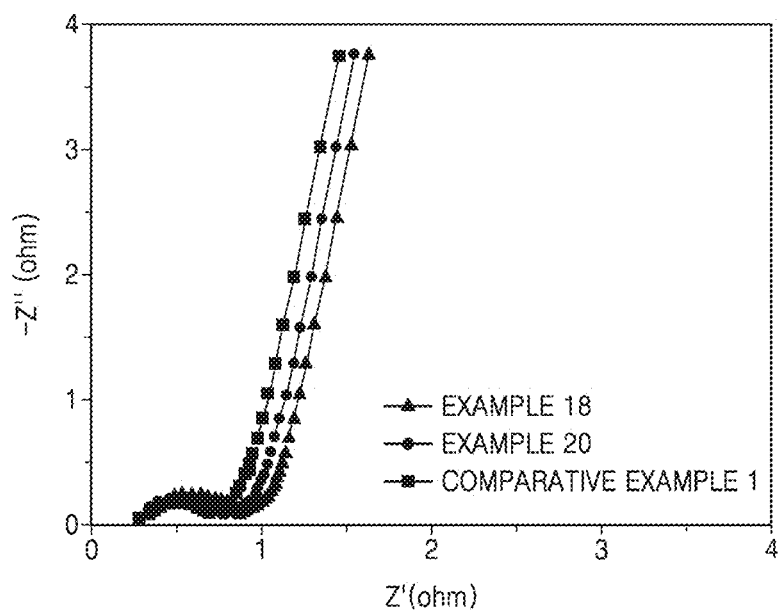
FIG. 6 is a Nyquist plot of real impedance (Z", ohm) versus imaginary impedance (Z', ohm), illustrating the results of an impedance measurement on lithium metal batteries of Examples 18 and 20 and Comparative Example 1.

Nyquist plots obtained from the impedance measurements that were performed after 24 hours from the manufacture of the lithium metal batteries of Examples 18 and 20 and Comparative Example 1 are shown in FIG. 6. In FIG. 6, an interfacial resistance between the lithium metal electrode and the protective layer depends from the positions and sizes of semicircles. Bulk resistances of the lithium metal batteries of Example 18, Example 20, and Comparative Example 1 were measured. The results are shown in Table 5.

In the lithium metal battery of Example 18, microspheres having an average particle diameter of about 3 μm were used to form the protective layer of the negative electrode. In the lithium metal battery of Example 20, a mixture of microspheres having an average particle diameter of about 3 μm and microspheres having an average particle diameter of about 1.3 μm was used to form the protective layer of the negative electrode.

TABLE 5

| Example | Bulk resistance (ohms, Ω) |
|---|---|
| Example 18 | 0.53 |
| Example 20 | 0.6 |
| Comparative Example 1 | 0.44 |

Referring to FIG. 6 and Table 5, the lithium metal batteries of Examples 18 and 20 were found to have improved interfacial resistance characteristics.

2) Example 9 and Comparative Example 1

Each of the lithium metal batteries of Example 9 and Comparative Example 1 was charged at about 25° C. with a constant current of 0.1 C rate until a voltage of about 4.40 V (with respect to Li), and then with a constant voltage of 4.40 V until a cutoff current of 0.05 C rate, and was then discharged with a constant current of 0.1C rate until a voltage of about 2.8 V (with respect to Li) (Formation process, $1^{st}$ cycle). This cycle of charging and discharging was performed two times more to complete the formation process.

Each of the lithium metal batteries after the formation process was charged at room temperature (25° C.) with a constant current of 0.7 C to a voltage of about 4.4 V (with respect to Li) and then discharged with a constant current of 0.5C until a cutoff voltage of 3.0 V.

This cycle of charging and discharging was repeated 100 times in total. Changes in resistance characteristics before and after the 100 cycles are shown in FIG. 12.

Figure 12:
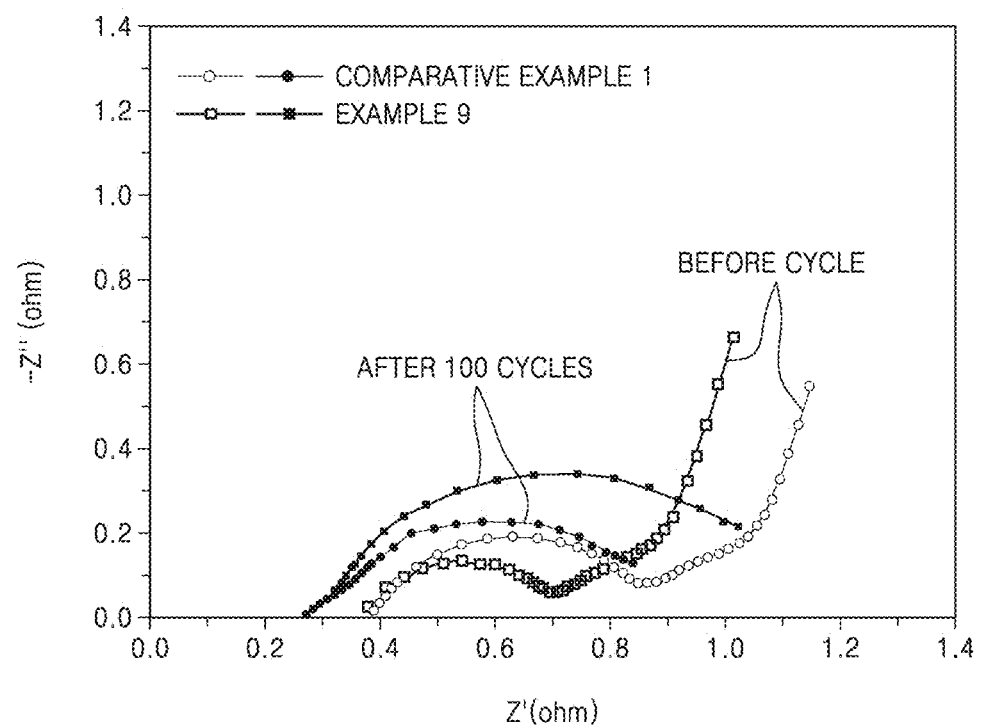
FIG. 12 is a Nyquist graph of real impedance (Z", ohm) versus imaginary impedance (Z', ohm), illustrating cell resistance characteristics after 100 charge and discharge cycles in the lithium metal batteries of Example 9 and Comparative Example 1.

Referring to FIG. 12, the lithium metal battery of Example 9 was found to have a reduced cell resistance increase after the 100 cycles, compared to the lithium metal battery of Comparative Example 1.

Evaluation Example 6: Charge-Discharge Characteristics (Discharge Capacity)

1) Example 22 and Comparative Example 5

Each of the lithium metal batteries of Example 22 and Comparative Example 5 was charged at about 25° C. with a constant current of 0.1 Coulomb (C) rate until a voltage of about 4.40 Volts (V) (with respect to Li), and then with a constant voltage of 4.40 V until a cutoff current of 0.05 C rate, and was then discharged with a constant current of 0.1 C rate until a voltage of about 2.8 V (with respect to Li) (Formation process, $1^{st}$ cycle). This cycle of charging and discharging was performed two times more to complete the formation process.

Each of the lithium metal batteries after the formation process was charged at room temperature (25° C.) with a constant current of 0.7 C to a voltage of about 4.4 V (with respect to Li) and then discharged with a current of 0.5C until a cutoff voltage of 3.0 V. This cycle of charging and discharging was repeated 200 times in total. Discharge capacity change with repeating charge-discharge cycles are shown in FIG. 7.

Figure 7:
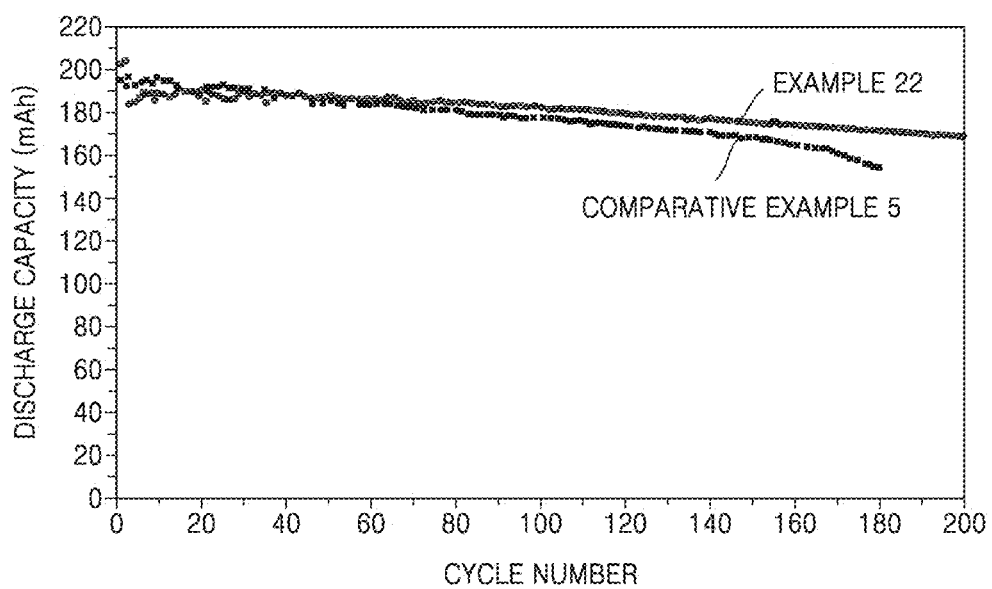
FIG. 7 is a graph of discharge capacity (milliampere hours, mAh) versus cycle number, illustrating the change in capacity retention rate of the lithium metal batteries of Example 22 and Comparative Example 5.

Referring to FIG. 7, the lithium metal battery of Example 22 was found to have improved lifetime characteristics, compared to the lithium metal battery of Comparative Example 5.

2) Example 9 and Comparative Example 1

Each of the lithium metal batteries of Example 9 and Comparative Example 1 was charged at about 25° C. with a constant current of 0.1 C rate until a voltage of about 4.40 V (with respect to Li), and then with a constant voltage of 4.40 V until a cutoff current of 0.05 C rate, and was then discharged with a constant current of 0.1C rate until a voltage of about 2.8 V (with respect to Li) (Formation process, $1^{st}$ cycle). This cycle of charging and discharging was performed two times more to complete the formation process.

Each of the lithium metal batteries after the formation process was charged at room temperature (25° C.) with a constant current of 0.7 C to a voltage of about 4.4 V (with respect to Li) and then discharged with a current of 0.5C until a cutoff voltage of 3.0 V.

This cycle of charging and discharging was repeated 190 times in total. Changes in discharge capacity with respect to the number of cycles are shown in FIG. 11.

Figure 11:
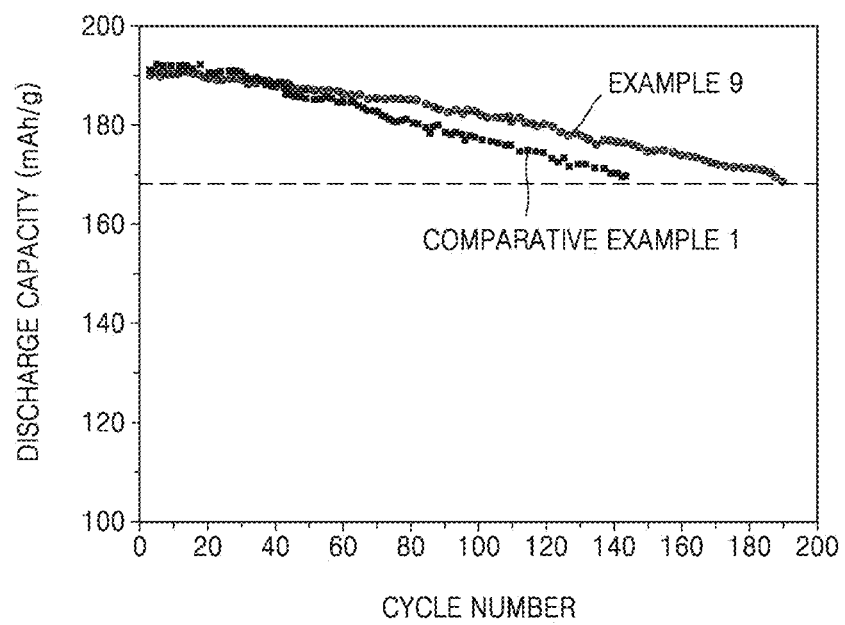
FIG. 11 is a graph discharge capacity (milliampere hours, mAh) versus cycle number, illustrating the change in discharge capacity with respect to the number of cycles in the lithium metal batteries of Example 9 and Comparative Example 1.

Referring to FIG. 11, the lithium metal battery of Example 9 was found to have a capacity retention (rate) of about 90% after the $190^{th}$ cycle, while the lithium metal battery of Comparative Example 1 exhibited a capacity retention of about 90% after the $146^{th}$ cycle, which indicates that the lithium metal battery of Example 9 had an improved capacity retention by about 30%, compared to that of the lithium metal battery of Comparative Example 1.

Evaluation Example 7: Rate Capability Characteristics

Figure 8:
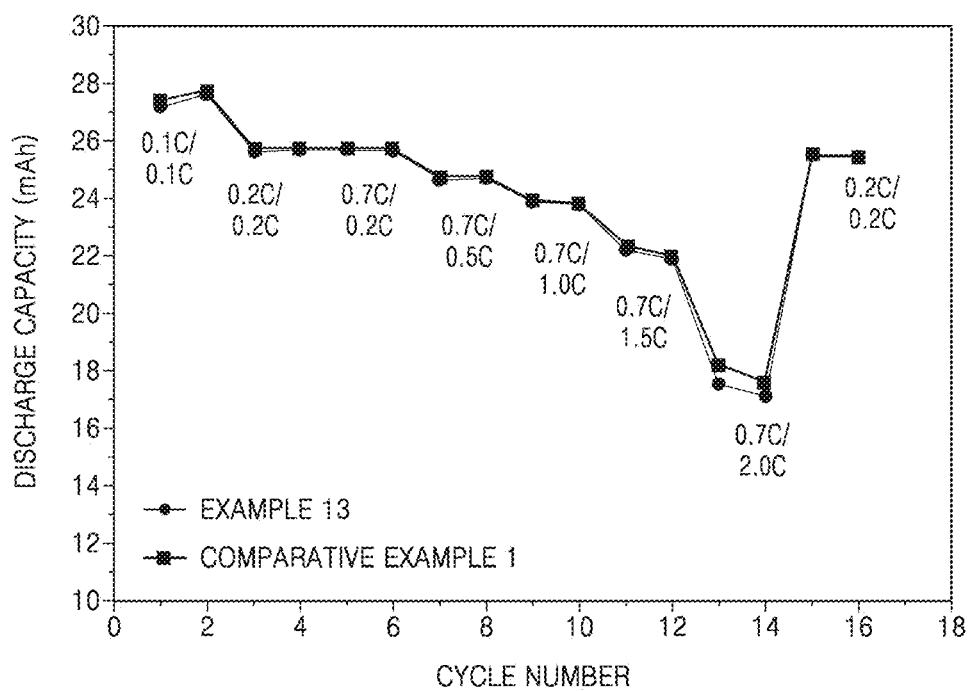
FIG. 8 is a graph of discharge capacity (mAh) versus cycle number for the lithium metal batteries of Example 13 and Comparative Example 1.

Rate capability characteristics of the lithium metal batteries of Example 13 and Comparative Example 1 were evaluated. The results are shown in FIG. 8.

Each of the lithium metal batteries of Example 13 and Comparative Example 1 was charged at about 25° C. with a constant current of 0.1 C rate to a voltage of about 4.40 Volts (V) (with respect to Li), and then with a constant voltage of 4.40 V until a cutoff current of 0.05C rate, and was then discharged with a constant current of 0.1 C rate to a voltage of about 3.0 V (with respect to Li). This cycle of charging and discharging was performed two times more to complete the formation process.

Next, each of the lithium metal batteries was charged with a constant current A1 and a constant voltage of 4.4V (0.05C cut-off) according to five different conditions as in Table 6. After a rest for about 10 minutes, each lithium metal battery was discharged with a constant current A2 according to the five different conditions in Table 3 to a voltage of about 3.0V. Through this charging and discharging cycle at the five different current levels, rate capabilities of the lithium metal batteries were evaluated. Also, the rate capabilities of the lithium metal batteries were evaluated under additional conditions in FIG. 8 other than shown in Table 6.

TABLE 6

|  | Condition 1 | Condition 2 | Condition 3 | Condition 4 | Condition 5 |
|---|---|---|---|---|---|
| Current A1 (C) | 0.2 | 0.7 | 0.7 | 0.7 | 0.7 |
| Current A2 (C) | 0.2 | 0.5 | 1.0 | 1.5 | 2.0 |

The rate capabilities of the lithium metal batteries of Example 13 and Comparative Example 1 are shown in FIG. 8. Referring to FIG. 8, the lithium metal battery of Example 13 was found to have improved rate capability, compared to the lithium metal battery of Comparative Example 1.

Rate capabilities of the lithium metal batteries of Examples 23 to 27 were evaluated in the same manner as applied to the lithium metal battery of Example 13. As a result of the evaluation, the lithium metal batteries of Example 23 to 27 were found to have a rate capability nearly equivalent to that of the lithium metal batteries of Example 13.

Evaluation Example 8: Tensile Modulus

After the protective layer-forming compositions of Examples 1 to 4 and Comparative Examples 2 to 4 were each cast on a substrate, tetrahydrofuran (THF) in the resulting cast product was slowly evaporated at about 25° C. for about 24 hours in an argon glove box, followed by drying under vacuum at about 25° C. for about 24 hours, thereby forming a protective layer in membrane form. The protective layer had a thickness of about 50 μm.

A tensile modulus of the protective layer was measured in accordance with ASTM F412 using a DMA800 (available from TA Instruments). Protective layer samples for the tensile modulus measurement were prepared according to the ASTM standard D412 (Type V specimens). The tensile modulus is also known as Young's modulus.

Variations in strain with respect to stress in the protective layer were measured at about 25° C., a relative humidity of about 30%, and a rate of 5 millimeters per minute (mm/min). The tensile modulus of the protective layer was calculated from the slope of a stress-strain curve thereof.

As a result of the tensile modulus measurement, the protective layers of Examples 1 to 4 were found to have a tensile modulus of about $10^6$ Pa or greater, which is higher than the tensile modulus of the protective layers of Comparative Examples 2 to 4. Thus, using the protective layer of Examples 1 to 4 with improved characteristics may effectively suppress volumetric change of the lithium metal negative electrode and growth of lithium dendrite.

Evaluation Example 9: Ion Conductivity

Ion conductivities of the protective layers formed in Examples 1 and 5 were measured as follows. The resistance in each of the protective layers was measured while scanning the temperature of the protective layer with a bias voltage of about 10 mV in a frequency range of about 1 Hz to 1 MHz, thereby measuring the ion conductivity of the protective layer.

As a result, the protective layers formed according to Examples 1 and 5 were found to have good ion conductivity.

Evaluation Example 10: Cell Thickness Change

Each of the lithium metal batteries of Example 22 and Comparative Example 1 was charged at about 25° C. with a constant current of 0.1 C rate to a voltage of about 4.4V (with respect to Li), and then with a constant voltage of 4.4 V (constant voltage mode) until a cutoff current of 0.05 C rate, and was then discharged with a constant current of 0.1C rate until a voltage of about 3.0 V (with respect to Li). This cycle of charging and discharging was performed two times more to complete the formation process.

Subsequently, each of the lithium metal batteries was charged at about 25° C. with a constant current of 0.7 C rate and then with a constant voltage of 4.4 V (0.05 C cut-off). After a rest for about 10 minutes, each lithium metal battery was discharged with a constant current of 0.5 C rate until a voltage of 3.0 V. This cycle of charging and discharging was repeated 200 times in total.

Figure 10:
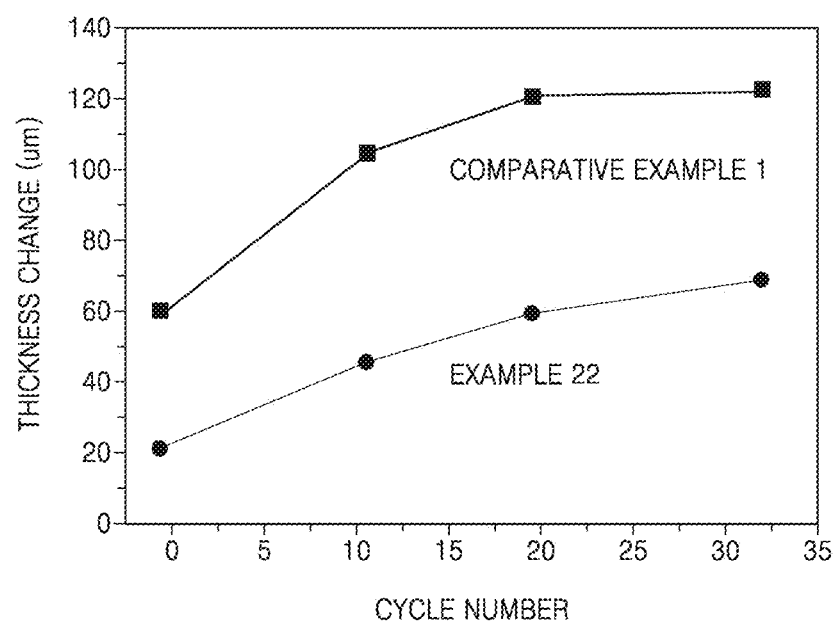
FIG. 10 is a graph of thickness change (μm) versus cycle number illustrating cell thickness change with respect to the number of cycles in the lithium metal batteries of Example 22 and Comparative Example 1.

Changes in cell thickness with respect to the number of cycles are shown in FIG. 10.

Referring to FIG. 10, the lithium metal battery of Example 22 was found to have a reduced thickness change, compared to the lithium metal battery of Comparative Example 1.

As described above, according to the one or more embodiments, a negative electrode for a lithium metal battery includes a protective layer including organic particles, inorganic particles, and/or organic-inorganic particles and a crosslinked material of a polymerizable oligomer between the particles. The protective layer provides improved mechanical properties such as strength to the negative electrode. Using the negative electrode having such a protective layer, a lithium metal battery having an effectively suppressed volumetric change during charging and discharging and improved cycle lifetime and discharge capacity, may be manufactured.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative electrode for a lithium metal battery, the negative electrode comprising:
   a lithium metal electrode comprising lithium metal or a lithium metal alloy; and
   a protective layer on at least a portion of the lithium metal electrode,
   wherein the protective layer has a Young's modulus of about $10^6$ Pascals to about 8 gigaPascals,
   wherein the protective layer comprises
   a plurality of first particles, wherein a first particle of the plurality of first particles comprises a polymer comprising a styrene unit and has a weight average molecular weight of about 10,000 Daltons to about 500,000 Daltons, and wherein the first particle has a particle size of greater than 1 micrometer to about 100 micrometers,
   wherein the polymer comprises homopolystyrene, a poly(styrene-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9alkyl) acrylate) copolymer, or a combination thereof, and
   a lithium salt adjacent the first particles, the lithium salt comprising LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof, and
   a crosslinked material of a polymerizable oligomer comprising an acrylate group, which are disposed between first particles of the plurality of first particles,
   wherein the polymerizable oligomer comprises diethylene glycol diacrylate, triethylene glycol diacrylate, tetraethylene glycol diacrylate, polyethylene glycol diacrylate, dipropylene glycol diacrylate, tripropylene glycol diacrylate, ethoxylated trimethylolpropane triacrylate, acrylate-functionalized ethylene oxide, 1,6-hexanediol diacrylate, ethoxylated neopentyl glycol diacrylate; propoxylated neopentyl glycol diacrylate, allyl methacrylate, trimethylolpropane triacrylate, trimethylolpropane trimethacrylate, pentaerythritol triacrylate, ethoxylated propoxylated trimethylolpropane triacrylate propoxylated glyceryl triacrylate, tris(2-hydroxyethyl) isocyanurate triacrylate, pentaerythritol tetraacrylate, dipentaerythritol pentaacrylate, or a combination thereof.

2. The negative electrode of claim 1, wherein an amount of the cross-linked material of the polymerizable oligomer is from about 10 parts by weight to about 50 parts by weight, based on 100 parts by weight of the at least one first particle in the protective layer.

3. The negative electrode of claim 1, wherein the plurality of first particles in the protective layer are chemically or physically cross-linked.

4. The negative electrode of claim 1, wherein the first particle has an average particle diameter of about 1.1 micrometer to about 50 micrometers.

5. The negative electrode of claim 1, wherein the polymer is a poly(styrene-divinylbenzene) copolymer.

6. The negative electrode of claim 1, wherein the first particle of the protective layer comprises a polymer comprising a poly(styrene-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9 alkyl) acrylate) copolymer, or a combination thereof.

7. The negative electrode of claim 1, wherein the protective layer further comprises a liquid electrolyte between the first particles.

8. The negative electrode of claim 7, wherein the liquid electrolyte occupies about 30 volume percent to about 60 volume percent of the total volume of the protective layer.

9. The negative electrode of claim 7, wherein the liquid electrolyte comprises a lithium salt and an organic solvent.

10. The negative electrode of claim 9, wherein the organic solvent comprises ethylene carbonate, propylene carbonate, dimethyl carbonate, diethyl carbonate, ethylmethyl carbonate, fluoroethylene carbonate, γ-butyrolactone, 1,2-dimethoxy ethane, 1,2-diethoxy ethane, diethylene glycol dimethyl ether, triethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, tetraethyleneglycol dimethyl ether, 1,1,2,2-tetrafluoroethyl 2,2,3,3-tetrafluoropropyl ether, or a combination thereof.

11. The negative electrode of claim 1, wherein the protective layer further comprises a second particle having a particle size, which is smaller than the particle size of the first particle.

12. The negative electrode of claim 1, wherein the protective layer comprises a single layer or multiple layers, and wherein the plurality of first particles in the protective layer comprises first particles having different particle sizes.

13. The negative electrode of claim 1, wherein the first particle comprises:
   a 1:1 weight ratio of a poly(styrene-divinylbenzene) copolymer having an average particle diameter of about 3 micrometers and a poly(styrene-divinylbenzene) copolymer having an average particle diameter of about 8 micrometers; or
   a 1:1 weight ratio of a poly(styrene-divinylbenzene) copolymer having an average particle diameter of about 3 micrometers and a poly(styrene-divinylbenzene) copolymer having an average particle diameter of about 1.1 micrometers to about 1.3 micrometers.

14. The negative electrode of claim 1, wherein
the polymer of the first particle in the protective layer comprises a cross-linked polymer, and
the cross-linked polymer has a degree of crosslinking of about 10 percent to about 30 percent, based on total volume of the cross-linked polymer.

15. The negative electrode of claim 1, wherein the protective layer has a porosity of about 0.1 percent to about 5 percent, based on a total volume of the protective layer.

16. The negative electrode of claim 1, wherein
the protective layer comprises a plurality of pores, and about 80% to 100% of the plurality of pores in the protective layer are filled with the crosslinked material of the polymerizable oligomer.

17. The negative electrode of claim 1, wherein the protective layer has a thickness deviation of about 0.1 micrometer to about 4 micrometers.

18. A lithium metal battery comprising a positive electrode, a negative electrode, and an electrolyte between the positive electrode and the negative electrode,
wherein the negative electrode comprises:
a lithium metal electrode comprising lithium metal or a lithium metal alloy; and
a protective layer on at least a portion of the lithium metal electrode,
wherein the protective layer has a Young's modulus of about $10^6$ Pascals to about 8 gigaPascals,
wherein the protective layer comprises
a plurality of first particles, wherein a first particle of the plurality of first particles comprises a polymer comprising a styrene unit and has a weight average molecular weight of about 10,000 Daltons to about 500,000 Daltons, and wherein the first particle has a particle size of greater than 1 micrometer to about 100 micrometers,
wherein the polymer comprises homopolystyrene, a poly(styrene-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9alkyl) acrylate) copolymer, or a combination thereof, and
a lithium salt adjacent the first particles, the lithium salt comprising LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof, and
a crosslinked material comprising a polymerizable oligomer comprising an acrylate group, which are disposed between first particles of the plurality of first particles,
wherein the polymerizable oligomer comprises diethylene glycol diacrylate, triethylene glycol diacrylate, tetraethylene glycol diacrylate, polyethylene glycol diacrylate, dipropylene glycol diacrylate, tripropylene glycol diacrylate, ethoxylated trimethylolpropane triacrylate, acrylate-functionalized ethylene oxide, 1,6-hexanediol diacrylate, ethoxylated neopentyl glycol diacrylate; propoxylated neopentyl glycol diacrylate, allyl methacrylate, trimethylolpropane triacrylate, trimethylolpropane trimethacrylate, pentaerythritol triacrylate, ethoxylated propoxylated trimethylolpropane triacrylate propoxylated glyceryl triacrylate, tris(2-hydroxyethyl) isocyanurate triacrylate, pentaerythritol tetraacrylate, dipentaerythritol pentaacrylate, or a combination thereof.

19. The lithium metal battery of claim 18, wherein the electrolyte comprises a liquid electrolyte, a solid electrolyte, a gel electrolyte, a polymer ionic liquid, or a combination thereof.

20. The lithium metal battery of claim 18, wherein the lithium metal battery further comprises a separator.

21. The lithium metal battery of claim 18, wherein the lithium metal battery has a lithium deposition density of about 0.2 grams per cubic centimeter to about 0.4 grams per cubic centimeter.

22. A method of manufacturing a negative electrode for a lithium metal battery, the method comprising:
providing a lithium metal electrode comprising lithium metal or a lithium metal alloy; and
disposing a protective layer on at least a portion of the lithium metal electrode to manufacture the negative electrode,
wherein the protective layer has a Young's modulus of about $10^6$ Pascals to about 8 gigaPascals, and comprises
a plurality of first particles, wherein a first particle of the plurality of first particles comprises a polymer comprising a styrene unit and has a weight average molecular weight of about 10,000 Daltons to about 500,000 Daltons, and wherein the first particle has having a particle size of greater than 1 micrometer to about 100 micrometers,
wherein the polymer comprises homopolystyrene, a poly(styrene-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9alkyl) acrylate) copolymer, or a combination thereof, and
a lithium salt adjacent the first particles, the lithium salt comprising LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof, and
a crosslinked material comprising a polymerizable oligomer, which are disposed between first particles of the plurality of first particles,
wherein the polymerizable oligomer comprises diethylene glycol diacrylate, triethylene glycol diacrylate, tetraethylene glycol diacrylate, polyethylene glycol diacrylate, dipropylene glycol diacrylate, tripropylene glycol diacrylate, ethoxylated trimethylolpropane triacrylate, acrylate-functionalized ethylene oxide, 1,6-hexanediol diacrylate, ethoxylated neopentyl glycol diacrylate; propoxylated neopentyl glycol diacrylate, allyl methacrylate, trimethylolpropane triacrylate, trimethylolpropane trimethacrylate, pentaerythritol triacrylate, ethoxylated propoxylated trimethylolpropane triacrylate, propoxylated glyceryl triacrylate, tris(2-hydroxyethyl) isocyanurate triacrylate, pentaerythritol tetraacrylate, dipentaerythritol pentaacrylate, or a combination thereof.

* * * * *